(12) United States Patent
Arai et al.

(10) Patent No.: US 9,753,268 B2
(45) Date of Patent: Sep. 5, 2017

(54) RETICLE UNIT, OPTICAL INSTRUMENT, AND RIFLE SCOPE

(75) Inventors: Satoshi Arai, Kawasaki (JP); Kenji Shikama, Ayase (JP); Yosuke Miyazaki, Ichihara (JP)

(73) Assignee: NIKON VISION CO., LTD., Tokyo (JP)

( * ) Notice: Subject to any disclaimer, the term of this patent is extended or adjusted under 35 U.S.C. 154(b) by 156 days.

(21) Appl. No.: 13/884,903

(22) PCT Filed: Oct. 21, 2011

(86) PCT No.: PCT/JP2011/074249
§ 371 (c)(1),
(2), (4) Date: Jul. 10, 2013

(87) PCT Pub. No.: WO2012/057010
PCT Pub. Date: May 3, 2012

(65) Prior Publication Data
US 2013/0286472 A1 Oct. 31, 2013

(30) Foreign Application Priority Data

Oct. 25, 2010 (JP) .................................. 2010-238473

(51) Int. Cl.
*G02B 23/02* (2006.01)
*G02B 23/14* (2006.01)
(Continued)

(52) U.S. Cl.
CPC ............... *G02B 23/02* (2013.01); *F41G 1/12* (2013.01); *F41G 1/345* (2013.01); *G02B 23/14* (2013.01)

(58) Field of Classification Search
CPC ........ G02B 23/02; G02B 23/14; G02B 27/34; G02B 23/145; G02B 17/00;
(Continued)

(56) References Cited

U.S. PATENT DOCUMENTS 4,374,612 A * 2/1983 Matsumura et al. ......... 396/288
5,065,520 A 11/1991 Shimizu et al.
(Continued)

FOREIGN PATENT DOCUMENTS

CN 2821513 Y 9/2006
DE 202010003869 U1 * 7/2010 ............. F41G 1/345
(Continued)

OTHER PUBLICATIONS

The English Translation of European document (EP 0 886 163 B1).*
(Continued)

*Primary Examiner* — Bumsuk Won
*Assistant Examiner* — Ephrem Mebrahtu
(74) *Attorney, Agent, or Firm* — Shapiro, Gabor and Rosenberger, PLLC

(57) ABSTRACT

Provided are a reticle unit that can secure excellent visibility of a reticle regardless of the background and an optical instrument including the reticle unit. A reticle unit 30 used in an optical instrument such as a rifle scope 50 includes: a reflector 32 provided with a concave portion 32b on one of surfaces of a plate-like optical member, wherein at least part of a side surface of the concave portion 32b is a reflection surface 32c; a light source 33 that is arranged laterally to the reflector 32 and that emits light; and a light collector 34 that is arranged between the light source 33 and the reflector 32 and that collects the light from the light source 33 to guide the light to the reflection surface 32c, wherein at least part of the light incident on the reflection surface 32c is totally reflected by the reflection surface 32c and emitted from the other surface of the reflector 32.

36 Claims, 30 Drawing Sheets

(51) Int. Cl.
    *F41G 1/12* (2006.01)
    *F41G 1/34* (2006.01)
(58) Field of Classification Search
    CPC . G02B 27/0189; G02B 2027/019; F41G 1/12;
            F41G 1/30; F41G 1/38; F41G 1/345;
            F41G 1/34; F41G 1/35; F41G 1/36
    USPC .......................................... 359/424–428, 853
    See application file for complete search history.

(56) References Cited

U.S. PATENT DOCUMENTS

| | | | |
|---|---|---|---|
| 5,905,592 A * | 5/1999 | Gohdo et al. | 359/424 |
| 7,804,643 B2 * | 9/2010 | Menges | G02B 27/34 359/399 |
| 2003/0086165 A1 * | 5/2003 | Cross | F41G 1/345 359/424 |
| 2004/0234812 A1 * | 11/2004 | Naito | G02B 27/34 428/690 |
| 2006/0092507 A1 | 5/2006 | Menges et al. | |
| 2009/0109529 A1 * | 4/2009 | Robitaille | 359/428 |
| 2010/0278480 A1 * | 11/2010 | Vasylyev | G02B 3/005 385/33 |
| 2011/0228395 A1 * | 9/2011 | Kammans | F41G 1/345 359/566 |
| 2011/0271576 A1 * | 11/2011 | Jahromi | F41G 1/38 42/122 |

FOREIGN PATENT DOCUMENTS

| | | |
|---|---|---|
| EP | 886163 B1 * | 4/2004 |
| JP | 61-179414 A | 8/1986 |
| JP | 03-029910 U | 3/1991 |
| JP | 07-113960 A | 5/1995 |
| JP | 2008-102225 A | 5/2008 |
| WO | WO 03/040800 A1 | 5/2003 |

OTHER PUBLICATIONS

International Preliminary Report on Patentability from International Application No. PCT/JP2011/074249, May 14, 2013.
International Search Report issued Jan. 24, 2012, in International Application No. PCT/JP2011/074249.
Office Action issued Sep. 11, 2015, in Japanese Patent Application No. 2012-540818.
Office Action issued Jan. 30, 2015, in Chinese Patent Application No. 201180051654.1.

* cited by examiner

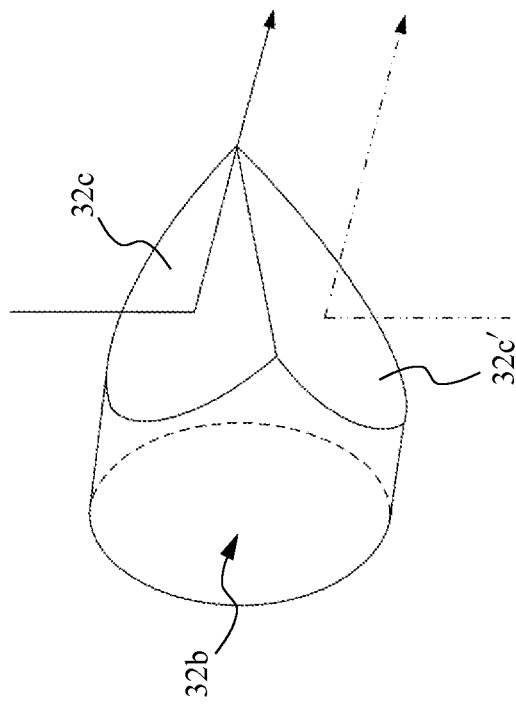
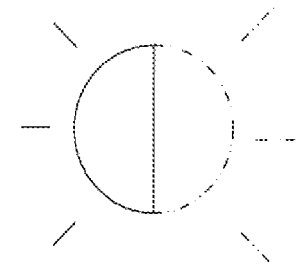
FIG. 5B
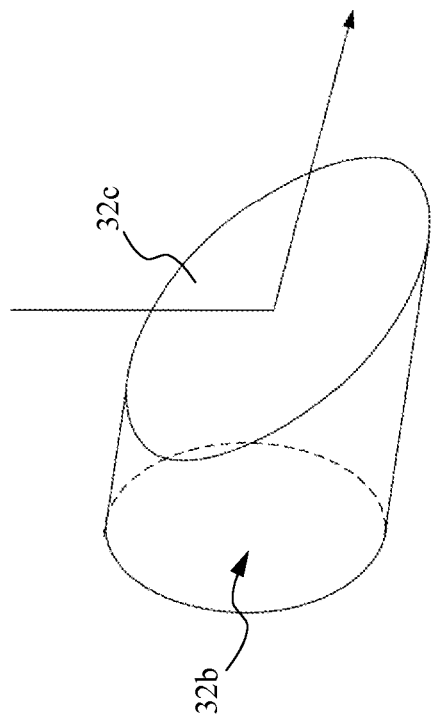
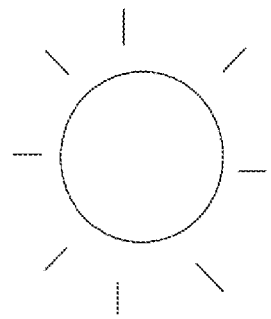
FIG. 5A

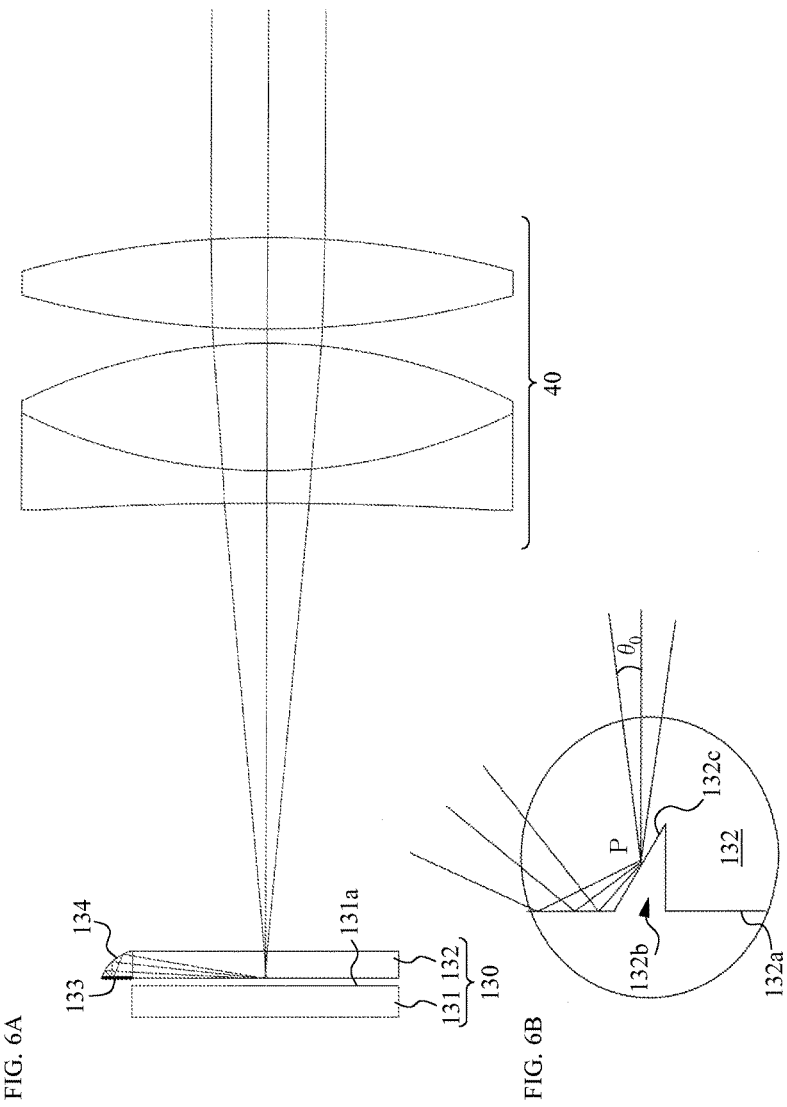

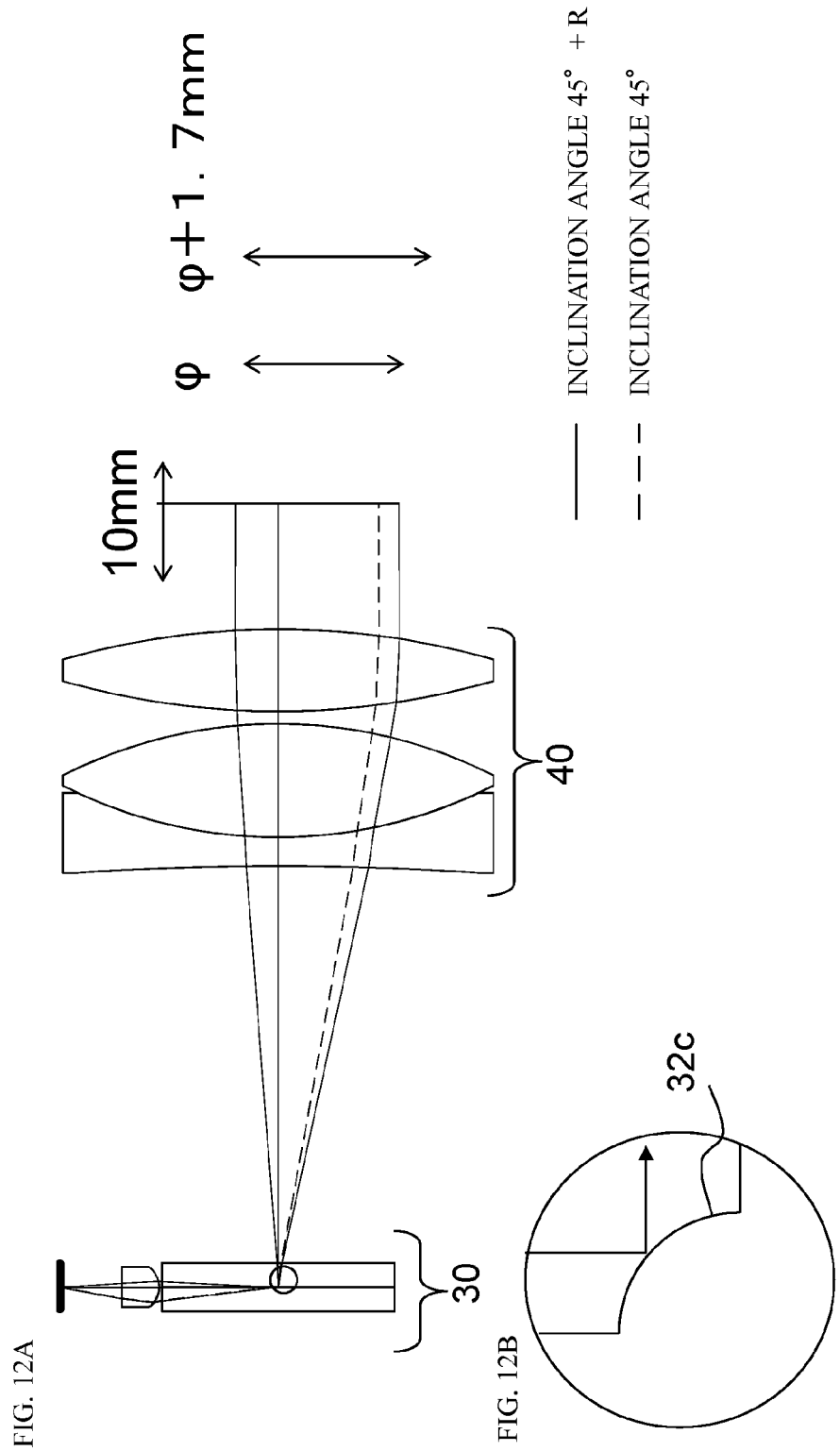

A-B CROSS SECTION

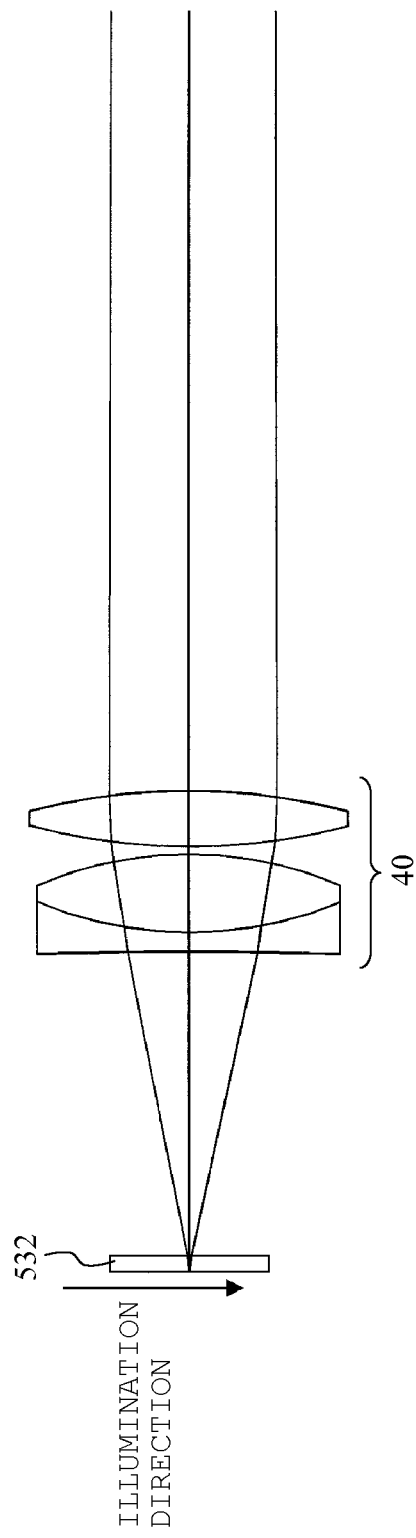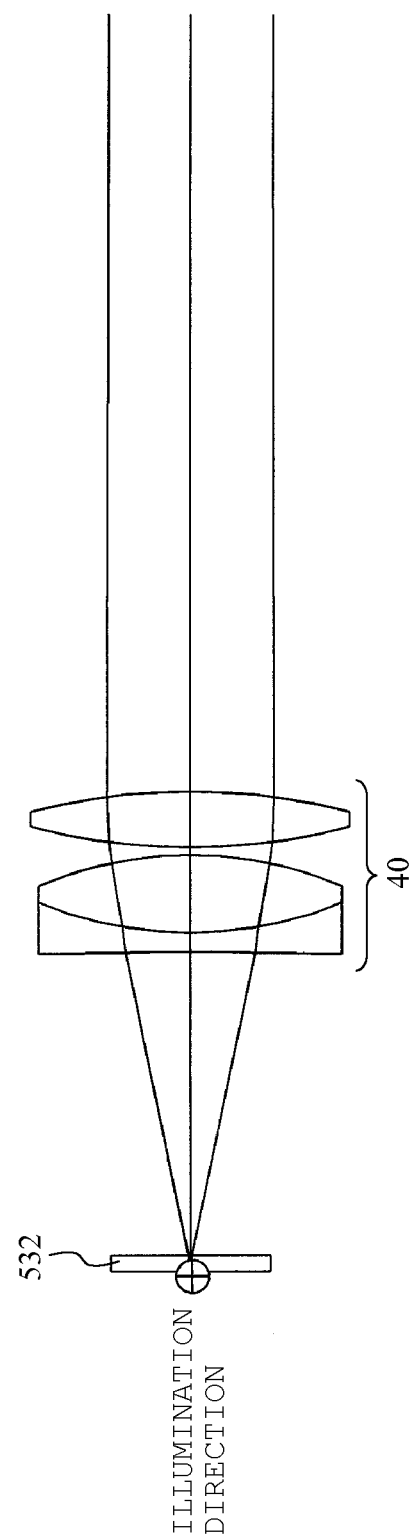

A-B CROSS SECTION

RETICLE UNIT, OPTICAL INSTRUMENT, AND RIFLE SCOPE

TECHNICAL FIELD

The present invention relates to a reticle unit, an optical instrument, and a rifle scope.

BACKGROUND ART

Reticles made of cross lines, a dot, or a combined shape of the cross lines and dot for aiming at a target are used in a scope for a gun sight such as a rifle scope (hereinafter, called "rifle scope"). Examples of the reticles include a reticle with two orthogonal wires in a cross line shape and a reticle provided with a cross or a dot formed by grooves or ink on a glass substrate. However, if the rifle scope with the conventional reticle is used in a dark environment such as during nighttime, it is difficult to secure excellent visibility. Therefore, a configuration for applying a phosphorescent phosphor on the reticle and directing light to that part and a technique for using an optical fiber to guide light to the reticle are proposed (for example, see Patent Literature 1).

CITATION LIST

Patent Literature

[Patent Literature 1] International Publication No. WO 03/040800

SUMMARY OF INVENTION

Technical Problem

However, there is a problem that even if the phosphor, the optical fiber, or the ink is used to guide the light to the reticle, a sufficient amount of light does not reach the eyes in the conventional reticle, and the reticle cannot be sufficiently viewed depending on the background.

The present invention has been made in view of the problem, and an object of the present invention is to provide a reticle unit that can secure excellent visibility of a reticle regardless of the background and to provide an optical instrument and a rifle scope including the reticle unit.

Solution to Problem

To solve the problem, a first present invention provides a reticle unit including: a reflector provided with a concave portion on one of surfaces of a plate-like optical member, wherein at least part of a side surface of the concave portion is a reflection surface; a light source that is arranged laterally to the reflector and that emits light; and a light collector that is arranged between the light source and the reflector and that collects the light from the light source to guide the light to the reflection surface, wherein at least part of the light incident on the reflection surface is totally reflected by the reflection surface and caused to exit from the other surface of the reflector. "Collect the light" denotes collecting divergent light emitted from the light source to convert the divergent light to substantially parallel light or convergent light.

In the reticle unit, it is preferable that the light collector is a condenser lens that forms an image of the light source on or near the reflection surface.

In the reticle unit, it is preferable that when an optical axis of the light source and the light collector is defined as a first optical axis, and an optical axis for reflecting the light by the reflection surface to exit the light from the reflector is defined as a second optical axis, a condition of the following expression is satisfied, wherein h denotes a depth in a direction of the second optical axis of the concave portion, Y denotes a diameter of the light source, $\beta$ denotes a magnification of the light collector, $\delta$ denotes an angle formed by the second optical axis and a normal line of the reflection surface, $\alpha$ denotes an angle formed by the second optical axis and the reflection surface, L denotes a height in a direction of the first optical axis of the reflection surface, D denotes a thickness in the direction of the second optical axis of the reflector, and $\Phi$ denotes an outer diameter in the direction of the first optical axis of the reflector.

[Expression 1]

$$\frac{y}{2} \cdot \beta \cdot \cos(\alpha - \delta) - \frac{L}{2\tan\alpha} < h < D - \frac{\Phi}{2\tan(2\delta)} - \frac{L}{2\tan\alpha}$$

In the reticle unit, it is preferable that a condition of the following expression is satisfied.

$$\delta = 90° - \alpha \quad \text{[Expression 2]}$$

In the reticle unit, it is preferable that a condition of the following expression is satisfied, wherein $\phi$ denotes a maximum outer diameter of the light collector.

[Expression 3]

$$\phi > D - \frac{\Phi}{2\tan(2\delta)} - \frac{L}{2\tan\alpha} - h$$

In the reticle unit, it is preferable that the angle $\alpha$ formed by the second optical axis and the reflection surface is 45°.

In the reticle unit, it is preferable that the light collector is made of a member different from the reflector, includes a light reflection collection surface in an aspheric shape, causes the light from the light source to reflect at the light reflection collection surface to be collected, and forms the image of the light source on or near the reflection surface.

In the reticle unit, it is preferable that inside of the reflector, the surface of the reflector provided with the concave portion totally reflects the light from the light source, and then the light enters the reflection surface.

It is preferable that the reticle unit further includes a reticle member provided with a reticle on one of the surfaces of the plate-like optical member, wherein the reflector is arranged so that one of the surfaces of the reflector faces the surface provided with the reticle.

In this case, it is preferable that the reticle member and the reflector are arranged to have an air space therebetween. Alternatively, it is preferable that the reticle member and the reflector are arranged by bonding the opposing surfaces.

In the reticle unit, it is preferable that the light collector is bonded to a side of the reflector. Alternatively, it is preferable that the light collector is bonded to a side of the reticle member. In this case, it is preferable that inside of the reticle member, the light from the light source is totally reflected by one of the side surfaces of the reticle member, which is not adjacent to the reflector, to guide the light to the reflector.

In the reticle unit, it is preferable that at least two parts of the side surface of the concave portion are the reflection surfaces, and the reticle unit is provided with the light source and the light collector for each of the reflection surfaces.

In the reticle unit, it is preferable that the reflection surface is a flat surface. Alternatively, it is preferable that the reflection surface is a curved surface convex toward the light source.

In the reticle unit, it is preferable that the light collector is a condenser lens that converts the light from the light source to substantially parallel light, and the reflection surface is a curved surface convex toward the light source.

In the reticle unit, it is preferable that when an optical axis of the light source and the light collector is defined as a first optical axis, and an optical axis for reflecting the light by the reflection surface to cause the light to exit from the reflector is defined as a second optical axis, the first optical axis and the second optical axis are substantially orthogonal.

In the reticle unit, it is preferable that the reflection surface is a toroidal surface in which curvatures are different between a meridional plane, which includes the first optical axis and the second optical axis, and a sagittal plane, which includes an optical axis of the reflection surface and which is perpendicular to the meridional plane, and the optical axis of the reflection surface is tilted substantially 45° relative to the second optical axis.

In the reticle unit, it is preferable that the reflection surface satisfies a condition of the following expression, wherein Rm denotes a radius of curvature in the meridional plane, Rs denotes a radius of curvature in the sagittal plane, n denotes a refractive index of a medium of the reflector, and L denotes a diameter in a direction of the first optical axis of the concave portion.

[Expression 4]

$$\sin^{-1}\left(-\frac{L}{\sqrt{2} \cdot Rm}\right) + \frac{\pi}{4} > \sin^{-1}\left(\frac{1}{n}\right)$$

$$\tan^{-1}\left(\frac{L}{\sqrt{4Rs^2 - L^2}}\right) = -\sin^{-1}\left(-\frac{L}{\sqrt{2} \cdot Rm}\right)$$

In the reticle unit, it is preferable that the light collector is a condenser lens that collects the light from the light source in a surface orthogonal to the second optical axis and that converts the light from the light source to substantially parallel light in a surface including the first optical axis and the second optical axis, and the reflection surface is a curved surface convex toward the light source.

In the reticle unit, it is preferable that when an optical axis of the light source and the light collector is defined as a first optical axis, and an optical axis for reflecting the light by the reflection surface to cause the light to exit from the reflector is defined as a second optical axis, the first optical axis and the second optical axis are substantially orthogonal.

In the reticle unit, it is preferable that the reflection surface is a cylindrical surface in which only a meridional plane, which includes the first optical axis and the second optical axis, has a curvature, and an intersection of the meridional plane and a sagittal plane, which includes the optical axis of the reflection surface and which is perpendicular to the meridional plane, is tilted substantially 45° relative to the second optical axis.

In the reticle unit, it is preferable that the reflection surface satisfies a condition of the following expression, wherein Rm denotes a radius of curvature in the meridional plane, n denotes a refractive index of a medium of the reflector, and L denotes a diameter in a direction of the first optical axis of the concave portion.

[Expression 5]

$$\sin^{-1}\left(-\frac{L}{\sqrt{2} \cdot Rm}\right) + \frac{\pi}{4} > \sin^{-1}\left(\frac{1}{n}\right)$$

In the reticle unit, it is preferable that a diameter of the projection obtained when the reflection surface is projected to the side surface provided with the concave portion forming the reflection surface is within a range of 10 µm to 200 µm.

A second present invention provides a reticle unit including: a reflector provided with a groove portion on one of surfaces of a plate-like optical member, wherein at least part of a side surface of the groove portion in a longitudinal direction is a reflection surface; and a light source that is arranged laterally to the reflector and that emits light, wherein at least part of the light incident on the reflection surface is totally reflected by the reflection surface and caused to exit from the other surface of the reflector.

In the reticle unit, it is preferable that the groove portion includes two grooves intersecting in a cross shape and includes two light sources for each of the two grooves. In this case, it is preferable that each of the light sources emits light of a different color.

It is preferable that the reticle unit further includes between the light source and the reflector, a light collector that collects the light from the light source to direct the light to at least part of the reflector.

It is preferable that the reticle unit further includes a reticle member provided with a reticle on one of the surfaces of the plate-like optical member, wherein the reflector is arranged so that one of the surfaces of the reflector faces the surface provided with the reticle.

In the reticle unit, it is preferable that the reflection surface is a flat surface. Alternatively, it is preferable that the reflection surface is a curved surface convex toward the light source.

In the reticle unit, it is preferable that the reflector is formed by mold processing.

In the reticle unit, it is preferable that the reflector is formed by a resin.

The present invention provides an optical instrument including: an objective lens; one of the reticle units described above, wherein the reflection surface is arranged at a position of an image formed by the objective lens or at a position substantially conjugate to the image; and an eyepiece for observation, wherein the image of the objective lens and the light caused to exit from the reflection surface of the reticle unit are placed on top of each other.

The present invention provides a rifle scope including: an objective lens; one of the reticle units described above, wherein the reflection surface is arranged at a position of an image formed by the objective lens or at a position substantially conjugate to the image; and an eyepiece for observation, wherein the image of the objective lens and the light causes to exit from the reflection surface of the reticle unit are placed on top of each other.

Advantageous Effects of Invention

If the reticle unit as well as the optical instrument and the rifle scope including the reticle unit according to the present invention are constituted as described above, the total reflection can be used to efficiently guide the light. Therefore, excellent visibility of the reticle can be secured regardless of the background, and the overall configuration can be compact.

BRIEF DESCRIPTION OF DRAWINGS

FIG. 5 is an explanatory view for explaining a configuration of a concave portion, (a) showing a configuration with one reflection surface, (b) showing a configuration with two reflection surfaces.

FIG. 6 is an explanatory view for explaining a reticle unit according to a second embodiment.

FIG. 12 is an explanatory view for explaining a reticle unit according to a fifth embodiment, (a) showing an overall configuration, (b) showing an enlarged view of main parts.

FIG. 27 is an explanatory view for explaining a pupil shape of an image of a light source of the reticle unit according to the eighth embodiment, (a) showing a side view of a rifle scope, (b) showing a plan view of the rifle scope.

DESCRIPTION OF EMBODIMENTS

Figure 1:
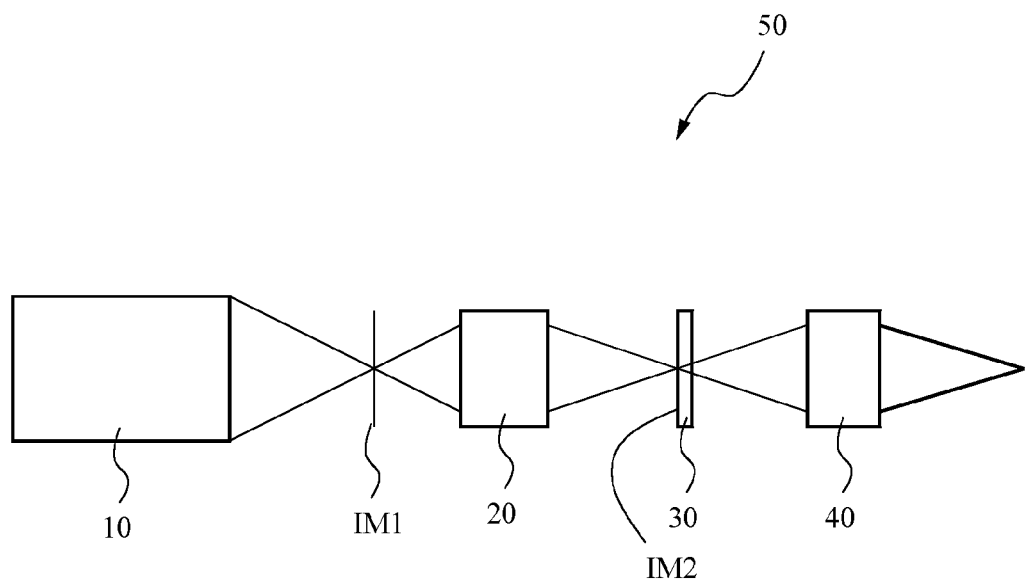
FIG. 1 is an explanatory view showing a configuration of a rifle scope as an example of an optical instrument.

Preferred embodiments of the present invention will be described with reference to the drawings. FIG. 1 will be used first to describe a configuration of a rifle scope as an example of an optical instrument in which a reticle unit according to the present embodiments is used. This rifle scope 50 includes an objective lens 10, an erecting lens 20, a reticle unit 30, and an eyepiece 40, in order from the side of an object. The objective lens 10 collects light from the object to form an inverted image (primary image) IM1 of the object, and the erecting lens 20 coverts the primary image IM1 that is an inverted image formed by the objective lens 10 to a secondary image IM2 that is an erected image. A reticle formed in the reticle unit 30 is arranged to substantially coincide with the secondary image IM2, at a position conjugate to the primary image IM1 of the objective lens 10. As a result of placing the secondary image IM2 and the reticle on top of each other and observing the image by the eyepiece 40, the optical axis of the rifle scope 50 can be accurately adjusted to the object as a target to collimate the target (object). The rifle scope 50 is an example of the optical instrument that uses the reticle unit according to the present embodiments, and in addition, the reticle unit 30 can also be applied to a monocular, a binocular, a surveying instrument, a spotting scope, and the like. The reticle can also be arranged to substantially coincide with the primary image IM1. Hereinafter, details of the reticle unit 30 will be described.

First Embodiment

Figure 2:
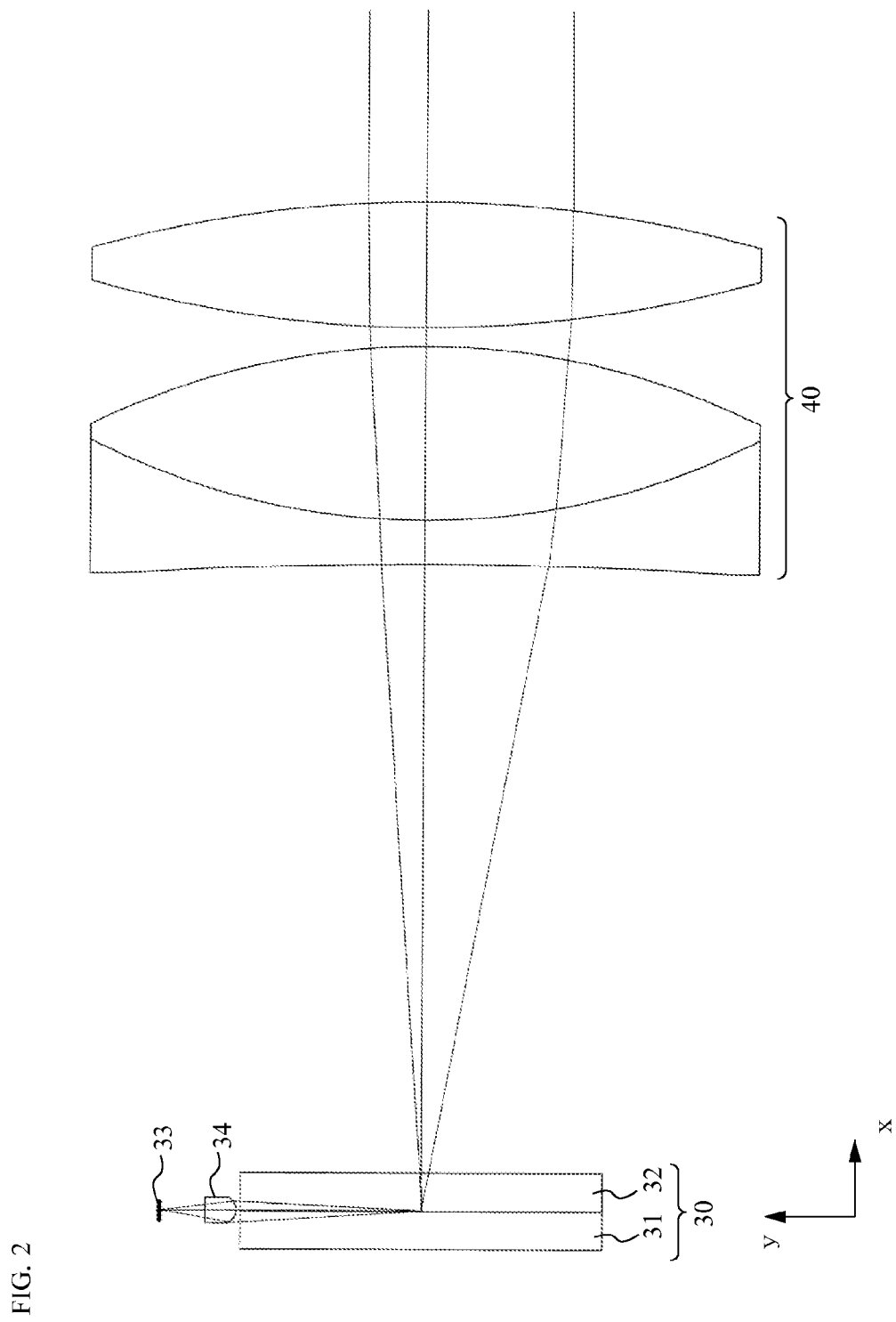
FIG. 2 is an explanatory view for explaining a reticle unit according to a first embodiment.
Figure 3B:
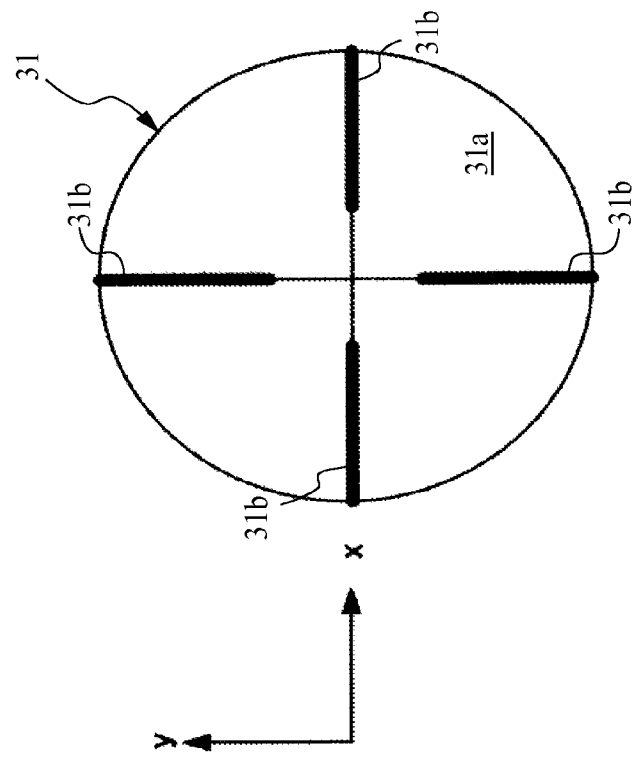
FIG. 3 is an explanatory view for showing a configuration of a reticle member, (a) showing a perspective view, (b) showing a front view.
Figure 3A:
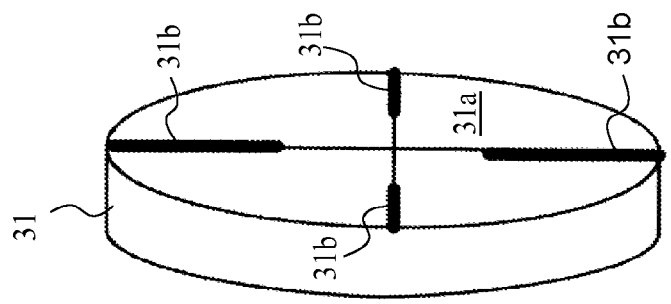
Figure 4:
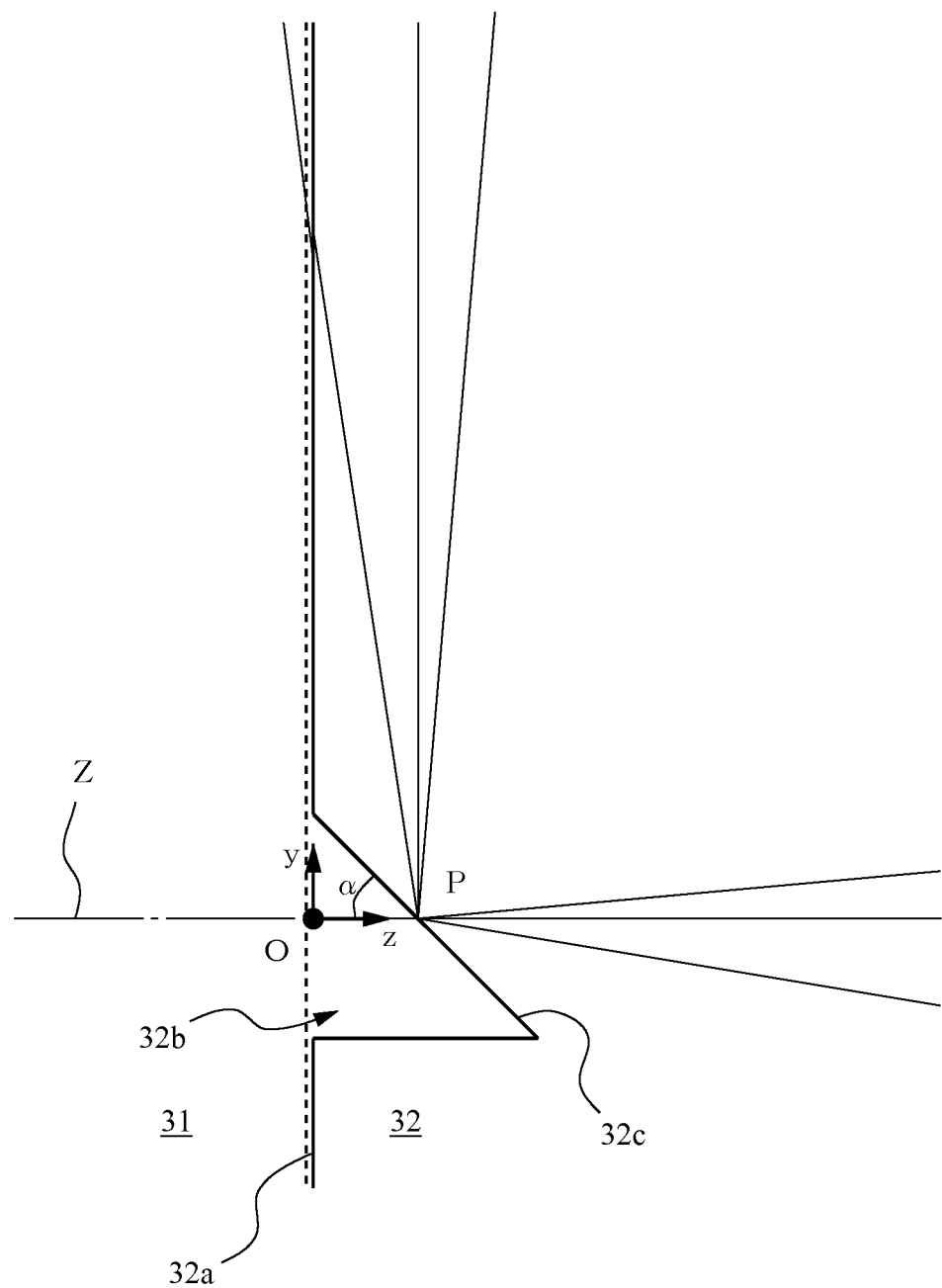
FIG. 4 is an explanatory view for explaining a reflection surface according to the first embodiment.

The reticle unit 30 according to a first embodiment will be described with reference to FIGS. 2 to 5. The reticle unit 30 includes: a reticle member 31 formed in a disc shape; a reflector 32 formed in a disc shape, arranged on the side of a surface (hereinafter, called "image side surface 31a") closer to an image of the reticle member 31, and bonded to or arranged near the image side surface 31a; a light source 33 that emits illumination light; and a light collector (for example, condenser lens) 34 that collects the light from the light source 33. In the following description, as shown in FIGS. 2 to 4, an optical axis direction of the rifle scope 50 will be referred to as a z axis, and two orthogonal directions in a surface orthogonal to the z axis will be referred to as an x axis and a y axis. In this case, the optical axis of the light collector 34 that is a light collection optical system will be referred to as the y axis.

The reticle member 31 is formed by an optical member through which light with at least a desired wavelength transmits, and as shown in FIG. 3, a reticle including four linear reticle drawings 31b extending in the x axis direction and the y axis direction from a center portion to peripheral portions is formed on the image side surface 31a. An intersection on extensions of the reticle drawings 31b extending in the x axis direction and the y axis direction is arranged to substantially coincide with the optical axis of the rifle scope 50. As described, the image side surface 31a is arranged to substantially coincide with the secondary image IM2 formed by the erecting lens 20, and the image side surface 31a substantially coincides with a focal plane on the object side of the eyepiece 40. Patterns of the reticle drawings 31b are formed on the image side surface 31a by a chromium film or ink, for example. FIG. 3 illustrates an example of the reticle drawings 31, and other forms are also possible.

Figures 8A, 8B:
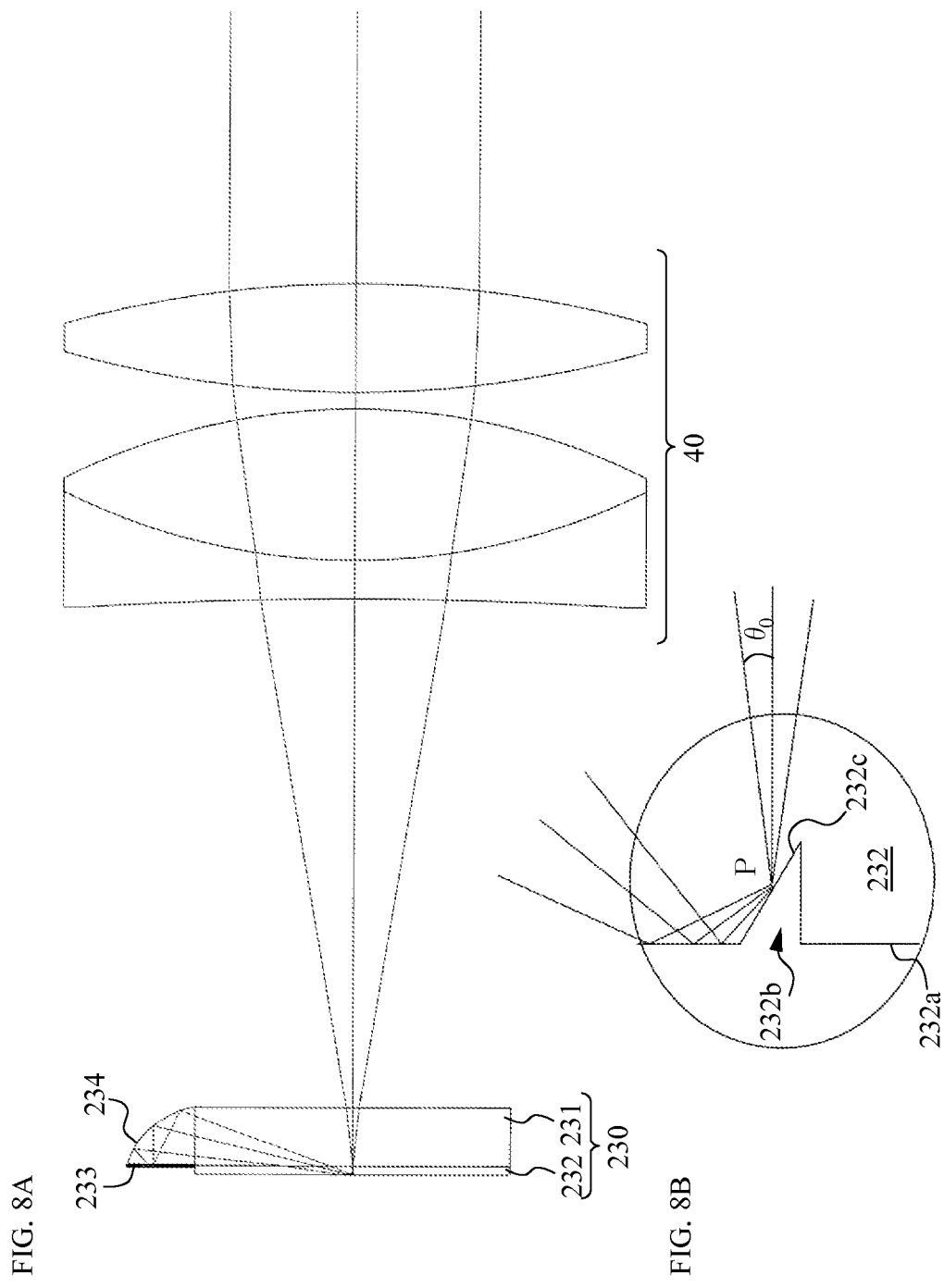
FIG. 8 is an explanatory view for explaining a reticle unit according to a third embodiment.
Figure 9:
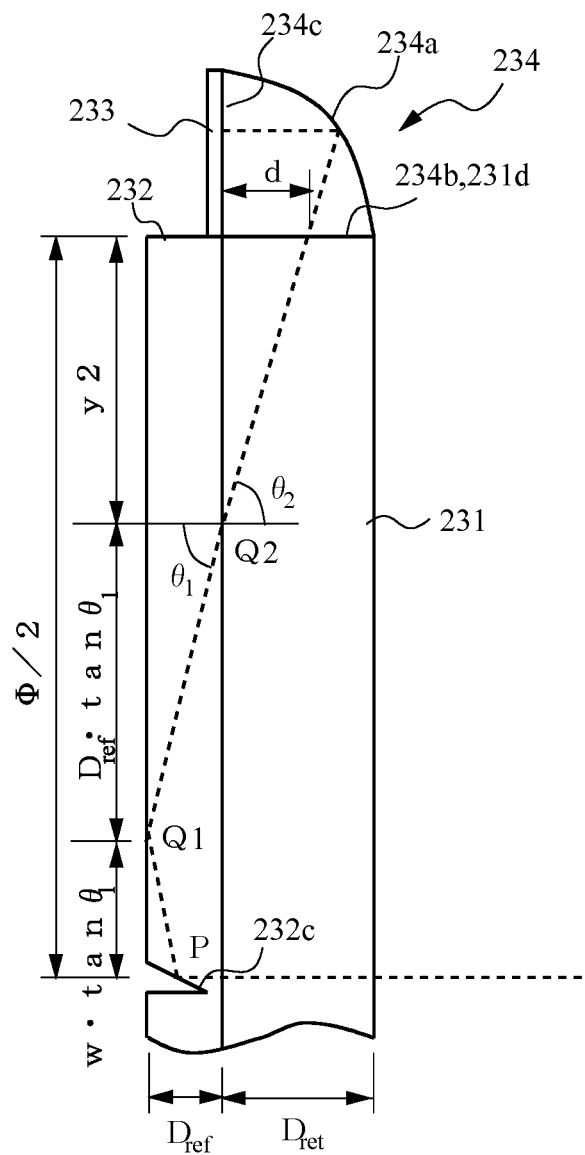
FIG. 9 is an explanatory view for explaining a reflection surface according to the third embodiment.

The reflector 32 is formed by an optical member through which light with at least a desired wavelength transmits. As shown in FIG. 4, a concave portion 32b that opens toward the object is formed at a substantially center portion of a surface (hereinafter, called "object side surface 32a") closer to the object, and part of a side surface forming the concave portion 32b has a flat-surface shape (hereinafter, the flat surface will be called "reflection surface 32c"). The shape when the reflection surface 32c is projected to the object side surface 32a is circular. As for the size of the reflection surface 32c, it is preferable that the diameter when the reflection surface 32c is projected to the object side surface 32a is 10 μm to 200 μm, as described later. To form a reflection surface in such a fine size with the shape as shown in FIG. 4, it is preferable to use a resin member as a material of the reflector 32 to perform mold processing. The mold processing using the resin can easily and inexpensively form a reticle unit. Obviously, the reflector 32 may be formed by a glass member, and in this case, the shape as shown in FIG. 4 can be formed by glass mold processing, lithography processing, or the like. As shown in FIGS. 8 and 9 described later, a reflector 232 may be formed by a resin, and a reticle member 231 may be constituted by glass to form a hybrid structure.

The reflection surface 32c includes an optical axis Z of the rifle scope 50, and the reflection surface 32c is arranged so that an angle α formed with the optical axis Z is substantially 45°. More particularly, the reflection surface 32c is arranged to overlap with the intersection when the reticle drawings 31b of the reticle member 31 are extended, when viewed from the optical axis direction (z axis direction) of the rifle scope 50. As described, the reflector 32 may be arranged so that the object side surface 32a is bonded to the image side surface 31a of the reticle member 31 or may be closely arranged (to have an air space). The example shown in FIGS. 2 and 4 illustrates the case of bonding. If an origin of the x axis, the y axis, and the z axis is defined as a point O where the optical axis Z of the rifle scope 50 and the object side surface 32a of the reflector 32 intersect, the reflection surface 32c is arranged substantially horizontal to the x axis and is arranged to form an angle of substantially 45° relative to the y axis and the z axis when viewed from the x axis direction, as shown in FIG. 4. The definition of the origin O is similar in the following description.

If an intersection of the reflection surface 32c and the optical axis Z of the rifle scope 50 is referred to as P, the light source 33 is arranged laterally to the reticle member 31 and the reflector 32, and the center of the light source 33 is arranged in the y axis direction of the point P. The light collector 34 is arranged between the reticle member 31 as well as the reflector 32 and the light source 33 and is configured to collect illumination light from the light source 33 and to form an image of the light source 33 at or near the point P on the reflection surface 32c. In this case, if the f-number of the light collector 34 is small, the diameter of a luminous flux caused to exit from the eyepiece 40 originated from the light source 33 is large. If the luminous flux diameter is greater, the observer can observe the image of the light source 33 near the center of the reticle member 31 even if the observer looks away from the optical axis. Therefore, it is desirable that the f-number is as small as possible.

If the reticle unit 30 is formed as described above, the light collector 34 collects the illumination light emitted from the light source 33, and the image is formed at or near the point P on the reflection surface 32c of the reflector 32. At least part of the image of the light source 33 is reflected by the reflection surface 32c in the optical axis direction (z axis direction) of the rifle scope 50 and exits from the image side surface of the reflector 32. As described, the eyepiece 40 is configured to be able to observe the reticle (reticle drawings 31b) of the reticle member 31 by placing the reticle and the secondary image IM2 on top of each other. Therefore, the image of the light source 33 reflected by the reflection surface 32c can also be observed. The image of the light source 33 is formed at or near the point P where the reflection surface 32c and the optical axis Z of the rifle scope 50 intersect. Therefore, if the image is in the depth of focus of the eyepiece 40, the observer can observe the image of the light source 33 as a dot image on the center portion of the field of view of the eyepiece 40, that is, on the optical axis Z of the rifle scope 50, and the target object can be easily collimated. The reflection surface 32c is formed by part of the side surface of the concave portion 32b formed to open toward the object side surface 32a of the reflector 32 and is arranged to form an angle of substantially 45 degrees relative to the y axis and the z axis. Therefore, if the difference between the refractive index of the medium forming the reflector 32 and the refractive index of the medium (for example, air) inside of the concave portion 32b is greater than a predetermined value, the illumination light from the light source 33 can be totally reflected by the reflection surface 32c. As a result, since the illumination light from the light source 33 can be efficiently reflected to guide the illumination light toward the eyepiece 40, the observer can observe a bright image and can clearly recognize the image of the light source 33 in the collimation of the target object.

Only one reflection surface 32c may be formed on the side surface of the concave portion 32b formed on the object side surface 32a of the reflector 32 as shown in FIG. 5(a), or two reflection surfaces 32c and 32c' may be formed to provide a V-shaped cross section when viewed from the x axis direction as shown in FIG. 5(b). In this case, the image of the light source 33 is substantially circular when one reflection surface 32c is formed as shown in FIG. 5(a), and the image is semicircular when two reflection surfaces 32c and 32c' are formed as shown in FIG. 5(b). In this case, the color of the image of the light source observed through the eyepiece 40 can be changed by arranging another light source and light collector for the reflection surface 32c' and changing the color of the illumination light emitted from each light source, and the observer can select the color that makes the observation easier according to the background. Three or more reflection surfaces may be formed on the concave portion 32b. The size of the reflection surface 32c affects the proportion of the image of the light source 33 in the entire field of view in the observation. The dot image hides the target if the size is too large, and it is difficult to view the dot image if the size is too small. In the reticle for rifle scope, it is preferable that the diameter of the reflection surface 32c is 10 μm to 200 μm when the reflection surface 32c is projected to the object side surface 32a, based on the specifications or the like of the optical system.

The following table 1 shows specifications of the reticle unit 30 as an example of the first embodiment. In the specification table, G1 denotes the reflector 32, and G2 denotes the reticle member 31. Furthermore, ϕ denotes a diameter of the reflector 32, α denotes an angle (hereinafter, called "inclination angle") formed by the optical axis Z of the rifle scope 50 and the reflection surface 32c, r1 denotes a radius of curvature of the surface on the object side of the reflector 32 and the reticle member 31, r2 denotes a radius of curvature of the surface on the image side of the reflector 32 and the reticle member 31, D denotes a thickness of the reflector 32 and the reticle member 31 in the z axis direction, and nC and nd denote refractive indexes of the medium of the reflector 32 and the reticle member 31 relative to a C line and a d line, respectively. Coordinates of the light source 33 and the light collector 34 indicate values on the x axis, the y axis, and the z axis in order from left, with the point O as an origin. The shape of the light collection surface of the light collector 34 (for example, the shape of the convex surface of the plano-convex condenser lens in the case shown in FIG. 2) is formed by an aspheric surface expressed by the following expression (a). In the expression (a), y denotes a height (incident height) in the perpendicular direction from the optical axis of the light collection optical system, S(y) denotes a distance (extent of aspheric surface or extent of sag) along the optical axis from a tangent plane at the apex of the aspheric surface to a position on the aspheric surface at the height y, R denotes a radius of curvature of the reference spherical surface, k denotes a conic constant, A4 denotes a fourth-order coefficient of the aspheric surface, A6 denotes a sixth-order coefficient of the aspheric surface, A8 denotes an eighth-order coefficient of the aspheric surface, and A10 denotes a tenth-order coefficient of the aspheric surface. Therefore, the following specifications indicate the aspheric surface by the values of the radius of curvature R, the conic constant k, and the coefficient of the aspheric surface An in the aspheric surface expression (a). In the values of the coefficient of the aspheric surface in the following specifications, "E-n" denotes "×10$^{-n}$".

[Expression 6]

$$S(y) = \frac{y^2/R}{1+\sqrt{1-(1+k)y^2/R^2}} + A4 \cdot y^4 + A6 \cdot y^6 + A8 \cdot y^8 + A10 \cdot y^{10} \quad (a)$$

The light source 33 side is positive in the y axis direction, and the image side is positive in the z axis direction. Although "mm" is generally used as the unit of the radii of curvature r1, r2, the thickness D, and the other lengths shown in the table 1 unless otherwise specifically stated, equivalent optical performance can be obtained even if the optical system is proportionately enlarged or proportionately shrunk. Therefore, the unit is not limited to "mm", and other appropriate units of length can also be used. The description of the specification table is also applied in the following embodiments.

TABLE 1

| Shapes of reflector 32 and reticle member 31 ϕ = 18.6 α = 45° | | | | |
|---|---|---|---|---|
| | r1 | r2 | d | nC | nd |
| G1 | ∞ | ∞ | 2.0 | 1.489204 | 1.491775 |
| G2 | ∞ | ∞ | 2.0 | 1.514322 | 1.516800 |

| Center coordinates of light source 33 |
|---|
| (0, 11.6, −0.05) |

| Shape of light collector 34 |
|---|
| R = 0.61904 |
| k = −0.662480 |
| A4 = −0.181184E−01   A6 = 0   A8 = 0   A10 = 0 |
| Center thickness = 1.6 |

| Material of light collector 34 |
|---|
| nC = 1.489204    nd = 1.491755 |

| Apex coordinates of light collector 34 |
|---|
| (0, 9.5, −0.05) |

As described, the reflector 32 can be bonded to or provided adjacent to the reticle member 31, and the light source 33 and the light collector 34 can be arranged laterally to the reticle member 31 and the reflector 32. In this way, the reticle unit 30 can be compactly formed. In the first embodiment, the lens surface of the light collector 34 may be formed above (closer to the light source 33), and the flat surface below may be bonded to at least one of the reflector 32 and the reticle member 31. Alternatively, the reflector 32 or the reticle member 31 may be formed integrally with the light collector 34. The reticle member 31 and the reflector 32 may not have disc shapes, and proper shapes for forming the rifle scope 50 are possible. These effects and configurations can also be obtained in the following embodiments.

Second Embodiment

If the light source 33 and the light collector 34 are arranged laterally to the reticle member 31 and the reflector 32 to directly collect the illumination light from the light source 33 to the reflection surface 32*c* of the reflector 32 as shown in the first embodiment, part of the illumination light emitted from the light source 33 is incident on the reflection surface 32*c* at an angle that does not allow total reflection as shown in FIGS. 2 and 4 (that is, such light transmits through the reflection surface 32*c*). Specifically, in FIG. 4, part of the luminous flux (oblique line section on the right side) closer to the eyepiece 40 (right side) relative to the optical axis of the light source 33 and the light collector 34 exceeds the angle that allows the total reflection by the reflection surface 32*c*, and the part transmits through the reflection surface 32*c*. Therefore, as shown in FIGS. 2 and 4, the diameter of the luminous flux above the optical axis Z is thin, and the loss of the light emitted from the light source 33 and guided toward the eyepiece 40 increases. In a reticle member 130 shown in a second embodiment, a light collector 134 is used to guide illumination light from a light source 133 into a reflector 132, and the light is totally reflected in the reflector 132 and guided to a reflection surface 132*c*. The second embodiment will be described with reference to FIGS. 6 and 7.

As shown in FIG. 6, the reticle unit 130 according to the second embodiment also includes: a reticle member 131 formed in a disc shape; the reflector 132 formed in a disc shape, arranged on the side of a surface (hereinafter, called "image side surface 131*a*") closer to an image of the reticle member 131, and bonded to or arranged near the image side surface 131*a*; the light source 133 that emits illumination light; and the light collector 134 that collects the light from the light source 133. The reticle member 131 according to the second embodiment has a similar configuration to the reticle member 31 described in the first embodiment. As in the reflector 32 according to the first embodiment, the reflection surface 132*c* is also formed by a concave portion 132*b* formed at a substantially center portion of an object side surface 132*a* in the reflector 132 according to the second embodiment (the concave portion 132*b* and the reflection surface 132*c* can have the shapes shown in FIG. 5). The second embodiment illustrates an arrangement of the reflector 132 through an air space relative to the reticle member 131.

Figure 7A:
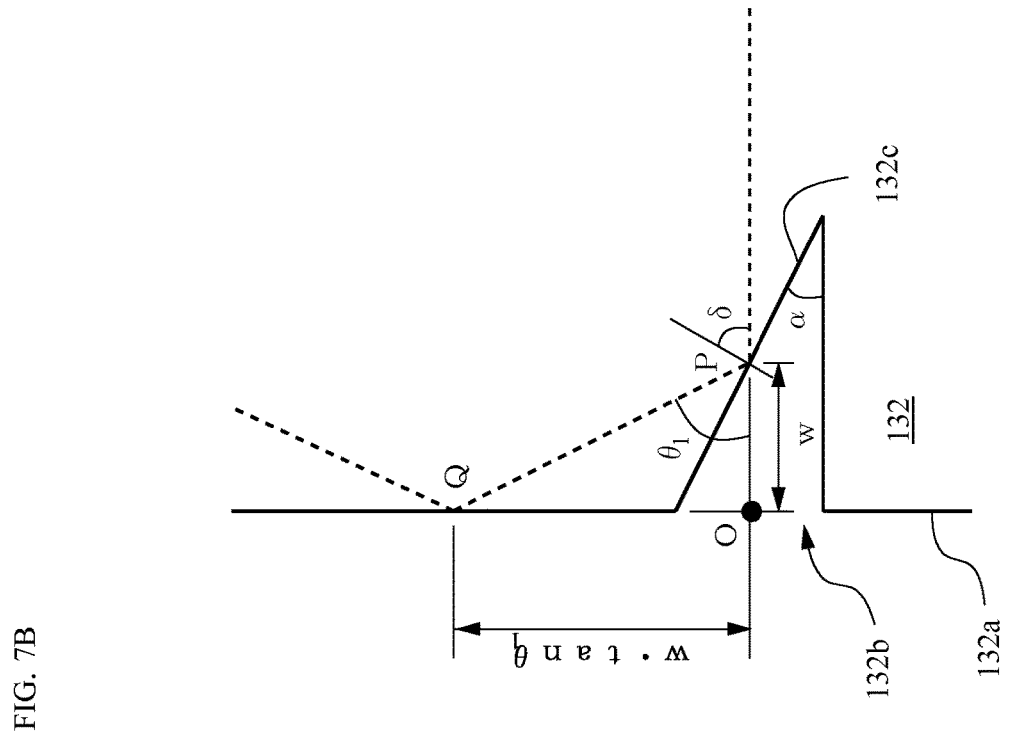
FIG. 7 is an explanatory view for explaining a reflection surface according to the second embodiment, (a) showing a side view of a reflector, (b) showing an enlarged view of main parts.
Figure 7B:
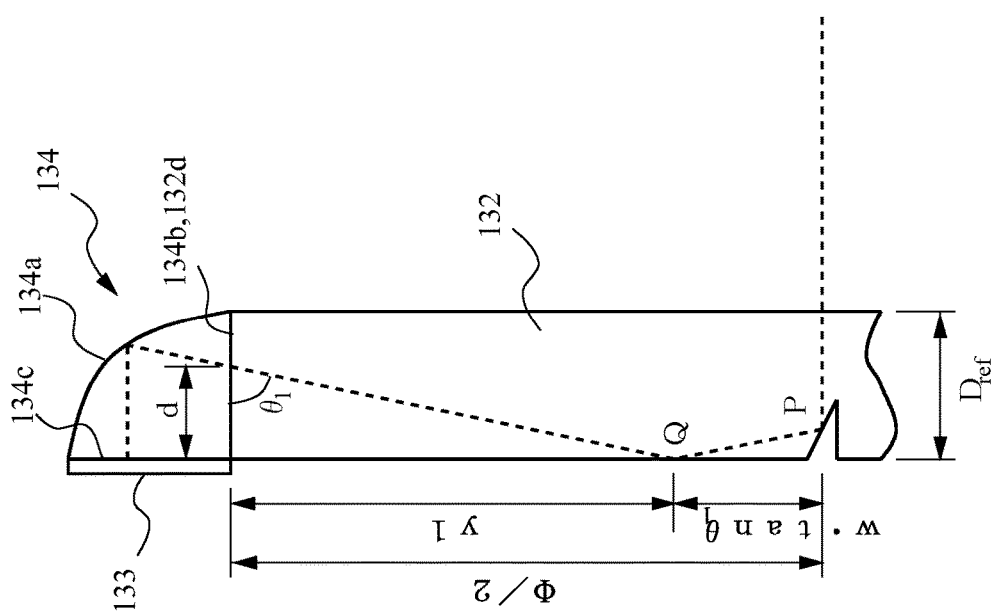

The light collector 134 has a cross-sectional shape in a substantially sector shape when viewed from the x axis direction as shown in FIG. 7, and reflection coating is applied to the surface of an arc section 134*a*. The arc section 134*a* is formed in an aspheric shape. Therefore, the arc section 134*a* forms an aspheric concave mirror. Light entered from the side of a radius 134*c* of the sector shape is reflected by the arc section 134*a* to collect light, and the light exits from the side of the other radius 134*b*. The radius 134*b* of the sector shape of the light collector 134 is bonded to an end face 132*d* (end face facing the reflection surface 132*c*) of the reflector 132 in the y axis direction so that the concave surface of the arc section 134*a* faces the object side. The light source 133 is attached to the other radius 134*c* of the sector shape of the light collector 134 and is configured to emit light toward the image along the optical axis of the rifle scope 50. The light reflection collection surface (arc section 134*a*) of the light collector 134 is configured to form an image of the light source 133 at or near the point P (intersection of the reflection surface 132*c* and the optical axis Z of the rifle scope 50) on the reflection surface 132*c* after the light from the light source 133 is totally reflected by the object side surface 132*a* of the reflector 132. Since the light from the light source 133 is once reflected by the object side surface 132*a* of the reflector 132, the inclination angle $\alpha$ of the reflection surface 132*c* is smaller than in the case of the first embodiment.

Although the condition for the total reflection is affected by two refractive indexes across the total reflection surface, the refractive index of generally used glass is distributed at about 1.4 to 1.8 including the resin member. Therefore, the angle incident on the reflection surface needs to be limited to cause the illumination light to exit in the Z axis direction when the exiting side is air (n=1), and this is equivalent to limiting the angle $\alpha$ formed by the reflection surface and the Z axis shown in FIG. 7. More specifically, based on the condition described above, it is desirable to set the angle $\alpha$ formed by the reflection surface and the Z axis within a range of $5°<\alpha<60°$.

In the reticle unit 130, the light emitted from the light source 133 enters from the radius 134*c* of the light collector 134. The light is reflected by the concave surface portion (arc section 134*a*) and collected. The light enters the end face 132*d* of the reflector 132 from the other radius 134*b*. The light passes inside of the reflector 132 and is totally reflected by the object side surface 132*a* of the reflector 132. The light is further totally reflected by the reflection surface 132*c* and guided to the optical axis direction (z axis direction) of the rifle scope 50. The light exits from the image side surface of the reflector 132.

The following table 2 shows specifications of the reticle unit 130 as an example of the second embodiment. In the table 2, values between the reflector 132 and the reticle member 131 indicate the air space between them. The shape of the arc section 134*a* of the light collector 134 is expressed by the constants of the aspheric surface expression (a).

TABLE 2

Shapes of reflector 132 and reticle member 131
$\phi = 18.6$
$\alpha = 42.01933°$

| | r1 | r2 | d | nC | nd |
|---|---|---|---|---|---|
| G1 | ∞ | ∞ | 1.9 | 1.489204 | 1.491775 |
| | | | 0.1 | 1.000000 | 1.000000 |
| G2 | ∞ | ∞ | 2.0 | 1.514322 | 1.516800 |

Center coordinates of light source 133

(0, 10.75306, 0)

Shape of arc section 134a of light collector 134

R = 1.01286
k = −0.968473
A4 = −0.108779E−00    A6 = 0.191941E−01    A8 = 0    A10 = 0

Material of light collector 134 nC = 1.489204      nd = 1.491755

Apex coordinates of arc section 134a of light collector 134

(0, 9.3, −1.9)

In the reticle unit 130, if a maximum exit angle of the light exiting from the reflection surface 132*c* is referred to as $\theta_0$, and a refractive index of the medium forming the reflector 132 is referred to as $n_{ref}$, an angle δ formed by the normal line of the reflection surface 132c and the optical axis Z needs to satisfy the following conditional expression (1) in order to totally reflect the light from the light source 133.

[Expression 7]

$$\delta = \sin^{-1}\left(\frac{1}{n_{ref}}\right) + \theta_0 \qquad (1)$$

In this case, if an angle formed by the light incident on the reflection surface 132c and the optical axis Z of the rifle scope 50 is referred to as $\theta_1$, and a distance between the point P and the origin O in the z axis direction is referred to as w, a point Q of reflection on the object side surface 132a of the reflector 132 is at a position separated by w·tan $\theta_1$ from the origin O in the y axis direction. Therefore, if a diameter of the reflector 132 is referred to as Φ, a distance y1 in the y axis direction from the point Q to the end face 132d of the reflector 132 is Φ/2−w·tan $\theta_1$. Therefore, if a thickness of the reflector 132 (thickness in the z axis direction) is referred to as $D_{ref}$, the light collector 134 needs to be formed so that the position (expressed by the distance d in the z axis direction from the object side surface 132a) where the light emitted from the light source 133 is incident on the end face 132d of the reflector 132 after being reflected by the light collector 134 satisfies the following conditional expression (2).

[Expression 8]

$$d = \frac{\frac{\Phi}{2} - (w \cdot \tan\theta_1)}{\tan\theta_1} \qquad (2)$$

where $0 < d < D_{ref}$

If a diameter of the opening of the concave portion 132b in the y axis direction is referred to as L, w and $\theta_1$ described above are obtained by the following expression (3).

[Expression 9]

$$w = \frac{L}{2\tan\alpha} \qquad (3)$$

$$\theta_1 = \pi - 2\alpha$$

According to the specifications shown in the table 2, the reticle unit 130 of the second embodiment satisfies the conditional expressions (1) to (3).

If the reticle unit 130 according to the second embodiment is used, the observer can observe the image of the light source 133 at the center portion of the field of view of the eyepiece 40, that is, on the optical axis Z of the rifle scope 50, and the target object can be easily collimated. Since the light from the light source 133 is totally reflected by the reflection surface 132c, the loss of light is little. The observer can observe a bright image and can clearly recognize the image of the light source 133 in the collimation of the target object. The light from the light source 133 is totally reflected once in the reflector 132 and guided to the reflection surface 132c. Therefore, if the reticle unit 130 is formed to satisfy the conditional expressions (1) to (3), an image of the light source without the deviation of the desired maximum exit angle $\theta_0$ can be formed, and the visibility of the image of the light source can be further improved.

If the reticle member 131 and the reflector 132 are separated as in the reticle unit 130 shown in the second embodiment, a reticle member used in a conventional rifle scope can be used as the reticle member 131. Actually, if the reticle member 31 and the reflector 32 are just in contact with each other in the arrangement, a minute air layer is created, and interference fringes may be generated in the contact surface. However, such a phenomenon does not occur in the bonding arrangement as in the first embodiment or in the separate arrangement as in the second embodiment. As in the first embodiment, it is only necessary that the reflection surface 132c be arranged in the depth of focus of the eyepiece 40. These descriptions are similar in the following embodiments.

When the light collector 134 is attached to the end face of the disc-shaped reflector 132 as shown in FIG. 6(a), the end face of the reflector 132 can be cut out by a surface orthogonal to the axis of the light from the light source 133 to form a flat surface (for example, cut out as in FIG. 28(a) described later to form a D shape), and the light collector 134 can be attached to the flat surface. This facilitates the attachment of the light collector 134 to the reflector 132, and the light emitted from the light source 133 can be efficiently guided into the reflector 132. In this case, the radius Φ/2 of the reflector 132 is the height from the intersection P (center of the reflector 132) of the optical axis Z of the rifle scope 50 and the reflection surface 132c to the cut flat surface (the above description can be applied in the following embodiments).

Third Embodiment

A reticle unit 230 according to a third embodiment will be described with reference to FIGS. 8 and 9. In the second embodiment, the configuration of attaching the light source 133 and the light collector 134 to the reflector 132 has been described. In the reticle unit 230 according to the third embodiment, a light source 233 and a light collector 234 are attached to the reticle member 231 as shown in FIG. 8, and a reflector 232 is further bonded to a surface on the object side of the reticle member 231. The reticle is formed on the surface on the object side of the reticle member 231, and a surface on the image side of the reflector 232 is bonded to the surface on the object side. A concave portion 232b is formed at a substantially central portion of an object surface 232a of the reflector 232, and part of a side surface forming the concave portion 232b forms a substantially flat reflection surface 232c (the concave portion 232b and the reflection surface 232c can have the shapes shown in FIG. 5). In the reticle unit 230 according to the third embodiment, the reticle member 231 and the reflector 232 may be formed by a resin or may be formed by glass members as described in the first embodiment. The reflector 232 may be formed by a resin, and the reticle member 231 may be formed by a glass member to form a hybrid structure. It is desirable that the reflector 232 is formed by mold processing.

The light collector 234 has the same shape as in the second embodiment. More specifically, the light collector 234 has a cross-sectional shape in a sector shape when viewed from the x axis direction as shown in FIG. 9, and reflection coating is applied to the surface of an arc section 234a. The arc section 234a is formed in an aspheric shape. Therefore, the arc section 234a forms an aspheric concave mirror. Illumination light entered from the light source 233 attached to the side of a radius 234c of the sector shape is reflected by the arc section 234a to collect light, and the light exits from the side of the other radius 234b. The other radius 234b of the light collector 234 is bonded to an end face 231d of the reticle member 231 in the y axis direction so that the concave surface of the arc section 234a faces the object side. Therefore, the light from the light source 233 is emitted toward the image.

The light reflection collection surface (arc section 234a) of the light collector 234 is configured to cause the light incident on the reticle member 231 to enter the reflector 232 from the surface bonded to the reflector 232, totally reflect the light by the object side surface 232a of the reflector 232, and then form an image of the light source 233 at or near the point P (intersection of the reflection surface 232c and the optical axis Z of the rifle scope 50) on the reflection surface 232c. Since the light from the light source 233 is once reflected by the object side surface 232a of the reflector 232, the inclination angle α of the reflection surface 232c is smaller than that of the first embodiment, as in the second embodiment.

In the reticle unit 230, the light emitted from the light source 233 enters from the radius 234c of the light collector 234. The light is reflected by the concave surface portion (arc section 234a) and collected. The light enters the end face 231d of the reticle member 231 from the other radius 234b. The light passes inside of the reticle member 231 and the reflector 232 and is totally reflected by the object side surface 232a of the reflector 232. The light is further totally reflected by the reflection surface 232c and guided to the optical axis direction (z axis direction) of the rifle scope 50. The light exits from the image side surface of the reflector 232 through the reticle member 231.

The following table 3 shows specifications of the reticle unit 230 as an example of the third embodiment. The shape of the arc section 234a of the light collector 234 is expressed by the constants in the aspheric surface expression (a).

TABLE 3

Shapes of reflector 232 and reticle member 231
ϕ = 18.6
α = 37.42436°

|  | r1 | r2 | d | nC | nd |
|---|---|---|---|---|---|
| G1 | ∞ | ∞ | 3.5 | 1.514322 | 1.516800 |
| G2 | ∞ | ∞ | 0.5 | 1.523300 | 1.527800 |

TABLE 3-continued

Center coordinates of light source 233

(0, 11.76443, −0.5)

Shape of arc section 234a of light collector 234

R = 0
k = −11.951704
A4 = −0.10858E−01    A6 = 0.328114E−03    A8 = 0    A10 = 0

Material of light collector 234 nC = 1.489204    nd = 1.491755

Apex coordinates of arc section 234a of light collector 234

(0, 9.3, −4.0)

In the reticle unit 230, an angle δ formed by the normal line of the reflection surface 232c and the optical axis Z needs to satisfy the conditional expression (1). If an angle formed by the light incident on the reflection surface 232c and the optical axis Z of the rifle scope 50 is referred to as $\theta_1$, and a distance between the point P and the origin O in the z axis direction is referred to as w, a point Q1 of reflection on the object side surface 232a of the reflector 232 is at a position separated by w·tan $\theta_1$ from the origin O in the y axis direction. Similarly, if a thickness (z axis direction thickness) of the reflector 232 is referred to as $D_{ref}$, a point Q2 where the light from the light source 233 enters the reflector 232 is at a position separated by $D_{ref}$·tan $\theta_1$ from the point Q1 in the y axis direction. Therefore, if a diameter of the reflector 232 is referred to as Φ, a distance y2 in the y axis direction from the point Q2 to the end face 231d of the reticle member 231 is $\Phi/2-(w\cdot\tan\theta_1+D_{ref}\cdot\tan\theta_1)$. Considering that the light of the light source 233 is refracted when the light enters the reflector 232 from the reticle member 231, if an incident angle of the light entering the point Q2 in the reticle member 231 is referred to as $\theta_2$ and a thickness (thickness in the z axis direction) of the reticle member 231 is referred to as $D_{ret}$, the light collector 234 needs to be formed so that the position (expressed by the distance d in the z axis direction from the object side surface of the reticle member 231) where the light emitted from the light source 233 enters the end face 231d of the reticle member 231 after being reflected by the light collector 234 satisfies the following conditional expression (4).

[Expression 10]

$$d = \frac{\frac{\Phi}{2} - (w\cdot\tan\theta_1 + D_{ref}\cdot\tan\theta_1)}{\tan\theta_2} \quad (4)$$

where $0 < d < D_{ret}$

The angle $\theta_2$ is expressed by the following expression (5), wherein a refractive index of the medium of the reticle member 231 is $n_{ret}$, and a refractive index of the medium of the reflector 232 is $n_{ref}$.

[Expression 11]

$$\theta_2 = \sin^{-1}\left(\frac{n_{ref} \cdot \sin\theta_1}{n_{ret}}\right) \quad (5)$$

According to the specifications shown in the table 3, the reticle unit 230 of the third embodiment satisfies the conditional expression (1) as well as the conditional expressions (4) and (5).

If the reticle unit 230 according to the third embodiment is used, the observer can observe the image of the light source 233 at the center portion of the field of view of the eyepiece 40, that is, on the optical axis Z of the rifle scope 50, and the target object can be easily collimated. Since the light from the light source 233 is totally reflected by the reflection surface 232c, the loss of light is little. The observer can observe a bright image and can clearly recognize the image of the light source 233 in the collimation of the target object. The light from the light source 233 is totally reflected once in the reflector 232 and guided to the reflection surface 232c. Therefore, if the reticle unit 230 is formed to satisfy the conditional expressions (1), (4), and (5), an image of the light source without the deviation of the desired maximum exit angle $\theta_0$ can be formed, and the visibility of the image of the light source can be further improved.

Fourth Embodiment

A reticle unit 330 according to a fourth embodiment will be described with reference to FIGS. 10 and 11.

Figure 10:
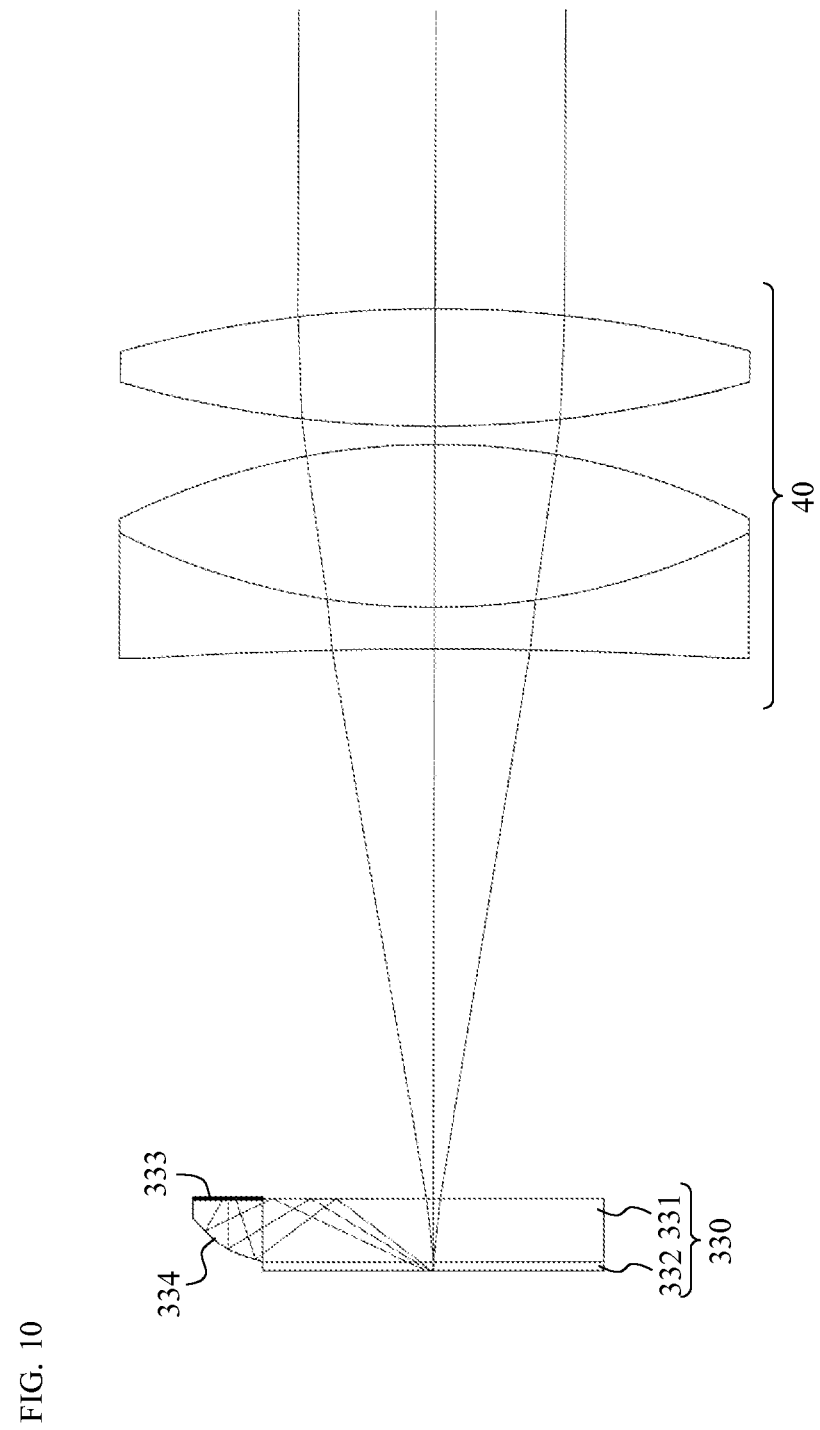
FIG. 10 is an explanatory view for explaining a reticle unit according to a fourth embodiment.
Figure 11:
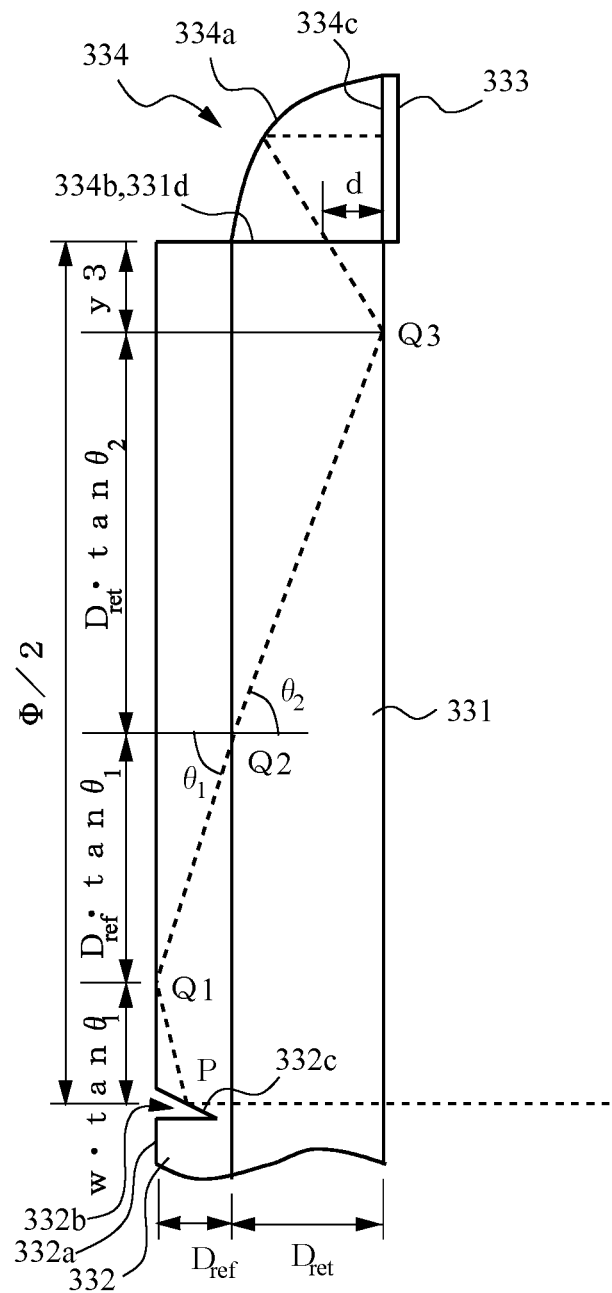
FIG. 11 is an explanatory view for explaining a reflection surface according to the fourth embodiment.

As shown in FIG. 10, the fourth embodiment is provided with a reticle on an object side surface of a reticle member 331 as in the third embodiment, and a reflector 332 as in the second embodiment is bonded to the object side surface. A concave portion 332b as in the second embodiment is formed on an object side surface 332a of the reflector 332, and a flat reflection surface 332c is formed by part of a wall forming the concave portion 332b (the concave portion 332b and the reflection surface 332c can have the shapes shown in FIG. 5).

In the reticle unit 330 according to the fourth embodiment, a light source 333 and a light collector 334 are attached to an end face 331d of the reticle member 331. As in the third embodiment, the shape of the light collector 334 is a cross-sectional shape in a sector shape when viewed from the x axis direction as shown in FIG. 11, and reflection coating is applied to the surface of an arc section 334a. The arc section 334a is formed in an aspheric shape. Therefore, the arc section 334a forms an aspheric concave mirror. Illumination light entered from the light source 333 attached to the side of a radius 334c of the sector shape is reflected by the arc section 334a to collect light, and the light is exited from the side of the other radius 334b. The other radius of the light collector 334 is bonded to the end face 331d of the reticle member 331 in the y axis direction, and in the fourth embodiment, the concave surface of the arc section 334a of the light collector 334 is bonded to face the image side. Therefore, the light from the light source 333 is emitted toward the object. The reflection surface (arc section 334a) of the light collector 334 is configured to totally reflect the light incident on the reticle member 331 by the image side surface of the reticle member 331, cause the light to enter the reflector 332 from the surface bonded to the reflector 332, totally reflect the light by the object side surface 332a of the reflector 332, and then form an image of the light source 333 at or near the point P (intersection of the reflection surface 332c and the optical axis Z of the rifle scope 50) on the reflection surface 332c. Since the light from the light source 333 is once reflected by the image side surface 332a of the reflector 332, the inclination angle α of the reflector 332c is smaller than that of the first embodiment, as in the second and third embodiments.

In the reticle unit 330, the light emitted from the light source 333 enters from the radius 334c of the light collector 334. The light is reflected by the concave surface portion (arc section 334a) and collected. The light enters the end face 331d of the reticle member 331 from the other radius 334b. After the light is reflected by the surface on the image side of the reticle member 331, the light passes inside of the reticle member 331 and the reflector 332 and is totally reflected by the object side surface 332a of the reflector 332. The light is further totally reflected by the reflection surface 332c and guided to the optical axis direction (z axis direction) of the rifle scope 50. The light is exited from the image side surface of the reflector 332 through the reticle member 331.

The following table 4 shows specifications of the reticle unit 330 as an example of the fourth embodiment. The shape of the arc section 334a of the light collector 334 is expressed by the constants of the aspheric surface expression (a).

TABLE 4

| Shapes of reflector 332 and reticle member 331 $\phi = 18.6$ $\alpha = 29.992789°$ | | | | | |
|---|---|---|---|---|---|
| | r1 | r2 | d | nC | nd |
| G1 | ∞ | ∞ | 3.5 | 1.514322 | 1.516800 |
| G2 | ∞ | ∞ | 0.5 | 1.489204 | 1.491755 |

| Center coordinates of light source 333 |
|---|
| (0, 11.2014, −4.0) |

| Shape of arc section 334a of light collector 334 |
|---|
| R = 1.83087 k = −2.975751 A4 = −0.116380E−02    A6 = 0.404830E−03    A8 = 0    A10 = 0 |

| Material of light collector 234 |
|---|
| nC = 1.489204            nd = 1.491755 |

| Apex coordinates of arc section 234a of light collector 234 |
|---|
| (0. 9.3, −0.5) |

In the reticle unit 330, an angle δ formed by the normal line of the reflection surface 332c and the optical axis Z needs to satisfy the conditional expression (1). If an angle formed by the light incident on the reflection surface 332c and the optical axis Z of the rifle scope 50 is referred to as $\theta_1$, and a distance between the point P and the origin O in the z axis direction is referred to as w, a point Q1 of reflection on the object side surface 332a of the reflector 332 is at a position separated by w·tan $\theta_1$ from the origin O in the y axis direction. If a thickness (z axis direction thickness) of the reflector 332 is referred to as $D_{ref}$, a point Q2 where the light from the light source 333 enters the reflector 332 is at a position separated by $D_{ref}$·tan $\theta_1$ from the point Q1 in the y axis direction. Considering that the light from the light source 333 is refracted when the light enters the reflector 332 from the reticle member 331, if an incident angle of the light entering the point Q2 in the reticle member 331 is referred to as θ₂ and a thickness (thickness in the z axis direction) of the reticle member 331 is referred to as $D_{ret}$, a point Q3 of reflection on the image side surface of the reticle member 331 is at a position separated by $D_{ret} \cdot \tan \theta_2$ from the point Q2 in the y axis direction. Therefore, if a diameter of the reflector 332 is referred to as Φ, a distance y3 from the point Q3 to the end face 331d of the reticle member 331 in the y axis direction is $\Phi/2-(w \cdot \tan \theta_1 + D_{ref} \cdot \tan \theta_1 + D_{ret} \cdot \tan \theta_2)$. Based on this, the light collector 334 needs to be formed so that the position (expressed by the distance d from the object side surface of the reticle member 331 in the z axis direction) where the light emitted from the light source 333 enters the end face 331d of the reticle member 331 after being reflected by the light collector 334 satisfies the following conditional expression (6). The angle θ₂ is expressed by the expression (5).

[Expression 12]

$$d = \frac{\frac{\Phi}{2} - (w \cdot \tan\theta_1 + D_{ref} \cdot \tan\theta_1 + D_{ref} \cdot \tan\theta_2)}{\tan\theta_2} \quad (6)$$

where $0 < d < D_{ret}$

According to the specifications shown in the table 4, the reticle unit 330 of the fourth embodiment satisfies the conditional expression (1) as well as the conditional expressions (5) and (6).

If the reticle unit 330 according to the fourth embodiment is used, the observer can observe the image of the light source 333 at the center portion of the field of view of the eyepiece 40, that is, on the optical axis Z of the rifle scope 50, and the target object can be easily collimated. Since the light from the light source 333 is totally reflected by the reflection surface 332c, the loss of light is little. The observer can observe a bright image and can clearly recognize the image of the light source 333 in the collimation of the target object. The light from the light source 333 is totally reflected once in the reflector 332 and guided to the reflection surface 332c. Therefore, if the reticle unit 330 is formed to satisfy the conditional expressions (1), (5), and (6), an image of the light source without the deviation of the desired maximum exit angle θ₀ can be formed, and the visibility of the image of the light source can be further improved. Since the configuration shown in the third embodiment and the configuration shown in the fourth embodiment can be selected according to the shape and the size of the reticle member 331, the degree of freedom for designing the route of the light from the light sources 233 and 333 can be improved.

Fifth Embodiment

In the first to fourth embodiments described so far, the reflection surfaces 32c to 332c formed on the reflectors 32 to 332 are formed as flat surfaces as shown in FIG. 5. However, as shown in FIG. 12(b), curved surfaces that are convex in the direction where the light from the light sources 33 to 333 enters (toward the light sources 33 to 333) are also possible. The following table 5 illustrates an example of the fifth embodiment, showing specifications when the reflection surface 32c is formed as a convex curved surface (when part of the side surface forming the concave portion 32b is a concave surface) in the reticle unit 30 with the configuration illustrated in the first embodiment. In the specifications shown in the table 5, the reflection surface 32c of the reflector 32 is formed in a spherical shape, and an inclination angle α denotes an angle relative to the optical axis Z (optical axis (second optical axis) for causing the light to exit which is reflected by the reflection surface 32c) of the tangent of the concave surface at the intersection of the optical axis (first optical axis) of the light source as well as the light collector and the reflection surface 32c formed by the concave surface.

TABLE 5

Shapes of reflector 32 and reticle member 31
φ = 18.6
α = 45°

| | r1 | r2 | d | nC | nd |
|---|---|---|---|---|---|
| G1 | ∞ | ∞ | 2.0 | 1.489204 | 1.491775 |
| G2 | ∞ | ∞ | 2.0 | 1.489204 | 1.491775 |

Radius of curvature of reflector 32 = 4.192673

Apex coordinates of reflector 32

(0, 0, 0.07071)

Center coordinates of light source 33

(0, 17.5, 0)

Shape of light collector 34

R = −1.64391
k = 0
A4 = 0.324050E−01   A6 = 0.507062E−02
A8 = 0.585238E−03   A10 = 0.808711E−03
Center thickness = 3

Material of light collector 34 nC = 1.489204   nd = 1.491755

Apex coordinates of light collector 34

(0, 9.5, 0)

If the reflection surface 32c formed on the reflector 32 is constituted as described above, as shown in FIG. 12(a), the diameter of the luminous flux in the observation through the eyepiece 40 is thicker when the reflection surface 32c is formed by a convex curved surface (illustrated by a solid line) than when the reflection surface 32c is formed by a flat surface (illustrated by a dashed line). For example, in the case of the specifications shown in the table 5, if the image is observed at a position 10 mm from the last surface of the eyepiece 40 with a focal distance of 60 to 70 mm, the size is about 1.7 mm thicker than when the reflection surface 32c is formed by a flat surface. Therefore, even if the center of the eye of the observer is deviated from the optical axis of the rifle scope 50 (even if the eye is shaken) by forming the reflection surface 32c by a convex curved surface, it is less likely that the luminance of the observed image is reduced.

Sixth Embodiment

In the embodiments described above, the reflection surfaces 32c to 332c formed on the reflectors 32 to 332 are formed as the concave portions 32b to 332b that open toward the object when viewed from the z axis direction as shown in FIG. 5. However, as shown in FIG. 13, a groove portion 432b with the cross section formed in a V shape can be provided on an object side surface 432a of a reflector 432.

Figure 13A:
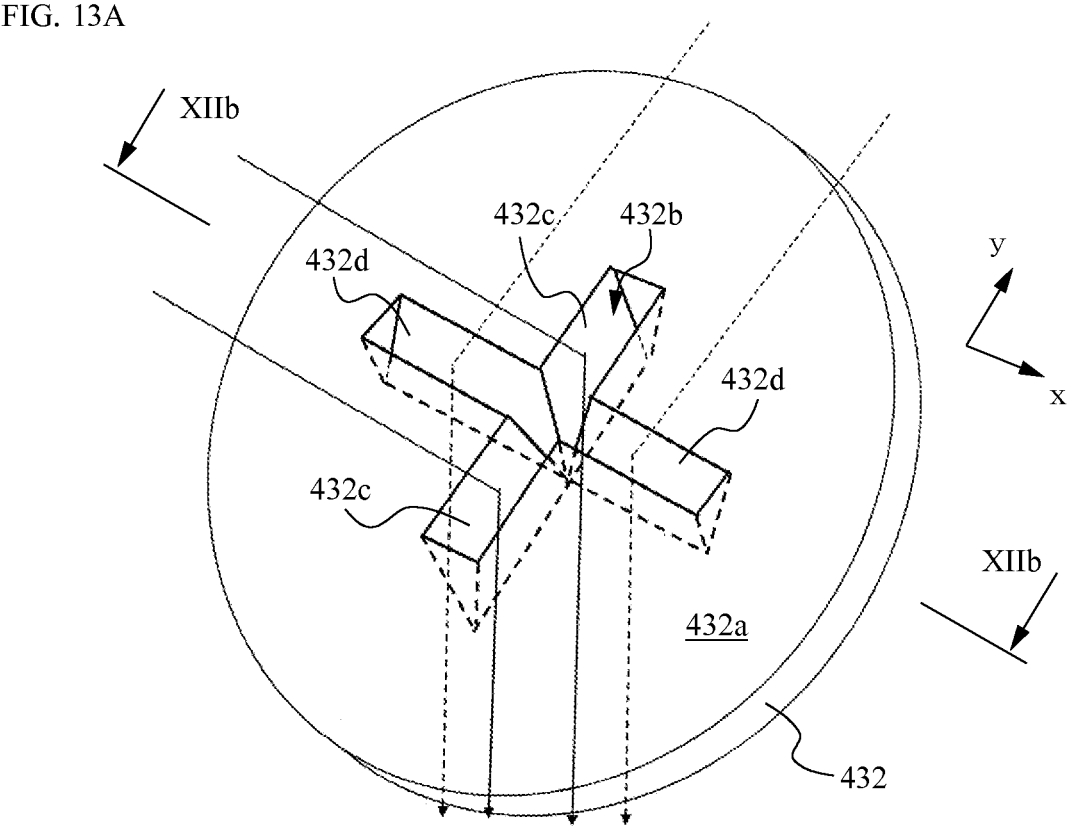
FIG. 13 is an explanatory view for explaining a reticle unit according to a sixth embodiment, (a) showing a perspective view of a reflector, (b) showing a cross-sectional view of XIIb-XIIb of (a), (c) showing a state when the reflector is observed.
Figure 13B:
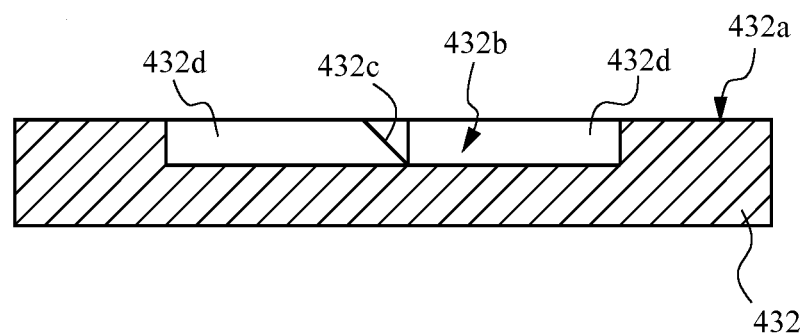
Figure 13C:
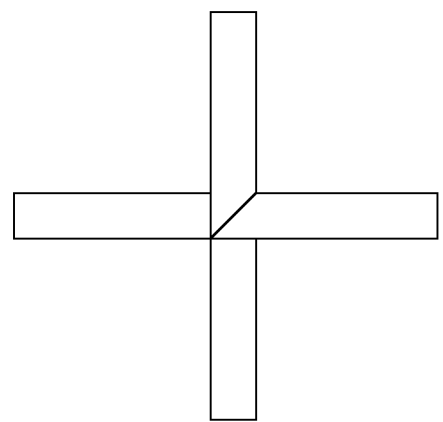

In this case, as shown in FIGS. 13(*a*) and 13(*b*), two grooves are formed in a cross shape, and the respective grooves are arranged to extend in the x axis direction and the y axis direction. When light from a light source not shown is directed to reflection surfaces 432*c* and 432*d* formed on the grooves, an image of light source in a cross shape as shown in FIG. 13(*c*) is formed in the field of view of the eyepiece.

According to the configuration of the reflector 432 of the sixth embodiment, for example, combination with the reticle member 31 shown in FIG. 3 can emphasize the reticle drawings 31*b* extending in the x axis direction and the y axis direction by the light from the light source and can clearly indicate the center portion. Alternatively, a cross reticle can be independently used based on the light from the reflection surfaces 432*c* and 432*d* without using the reticle member 31. A light source and a light collector that directs light from the light source along the reflection surface 432*c* extending in the direction orthogonal to the optical axis of the rifle scope 50 such as a cylindrical lens may be arranged for the illumination of the reflection surfaces 432*c* and 432*d* of the reflector 432, or the light from the light source may be directly emitted to the reflection surfaces 432*c* and 432*d* without the arrangement of the light collector. Since the reflector 432 according to the sixth embodiment is also configured to totally reflect the light from the light source by the reflection surfaces 432*c* and 432*d*, the loss of light is little. Even if the light collector is not arranged, a bright image can be observed, and the configuration of the reticle unit can be simplified.

Seventh Embodiment

Figure 14:
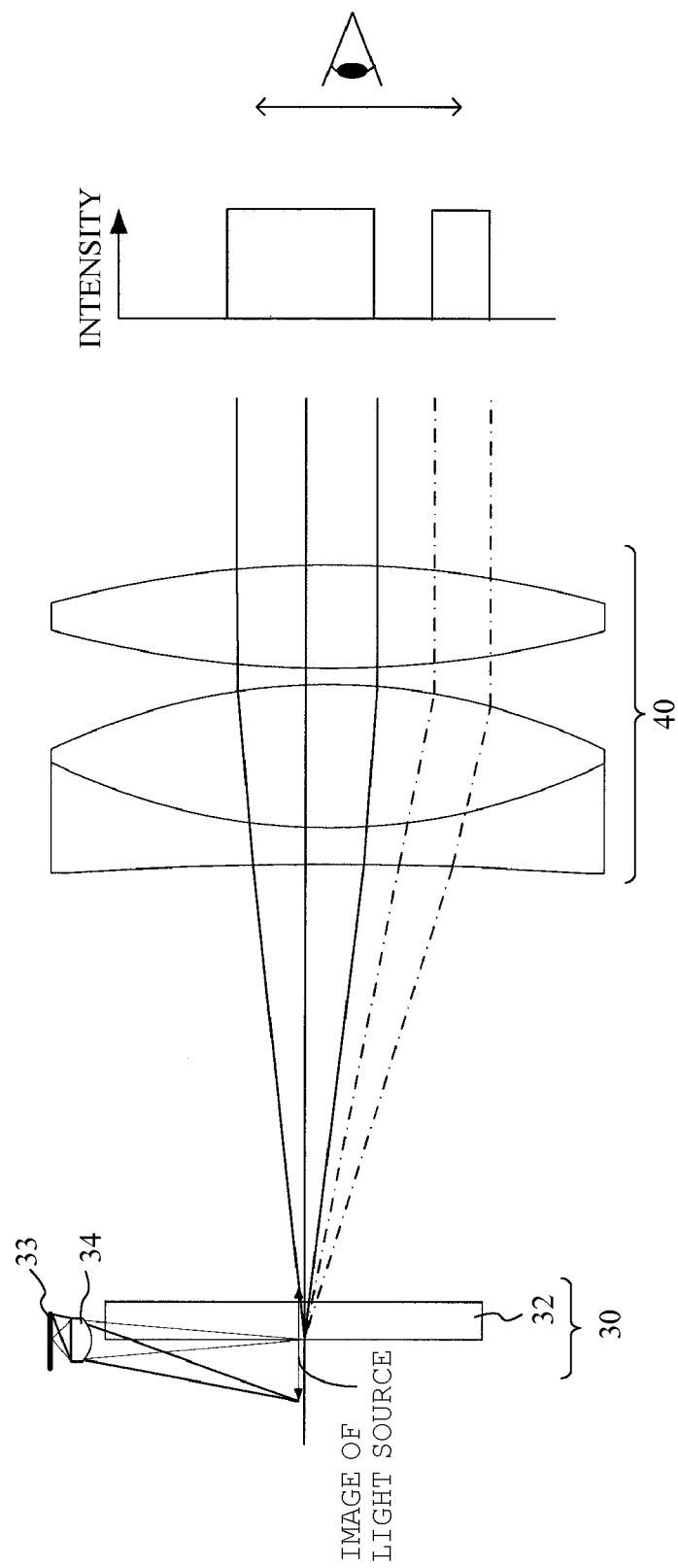
FIG. 14 is an explanatory view for explaining an intensity distribution of an image of a light source of the reticle unit according to the first embodiment.
Figure 15A:
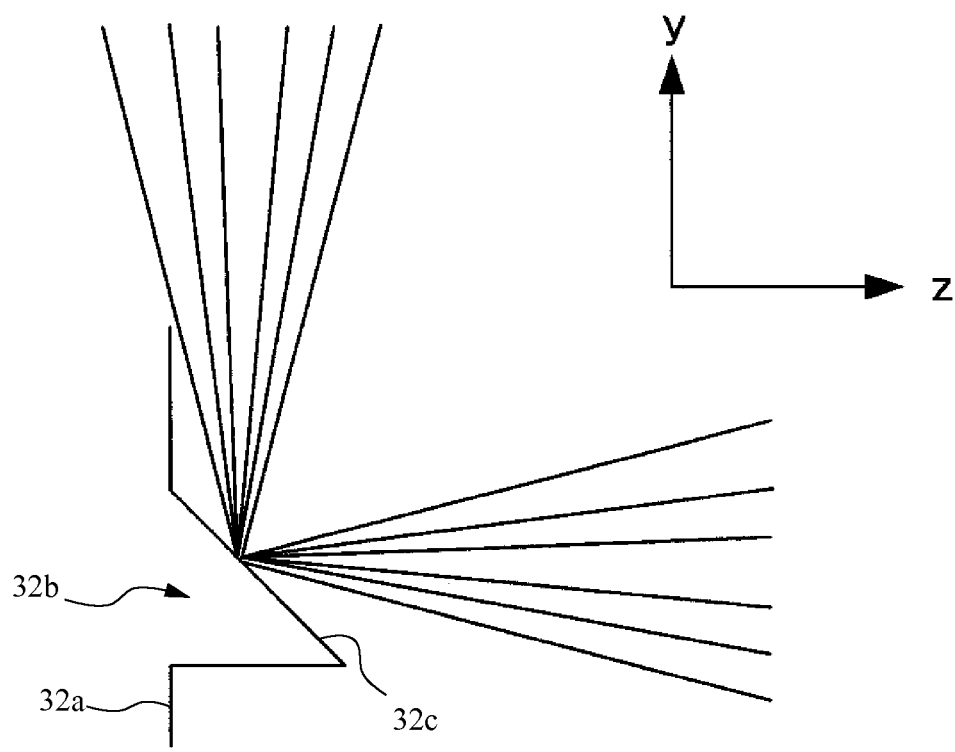
FIG. 15 is an explanatory view showing a state of a ray on a reflection surface for explaining the intensity distribution, (a) showing a state of a ray exiting from a point on an optical axis of the light source, (b) showing a state of a ray exiting from a point outside of the optical axis of the light source.
Figure 15B:
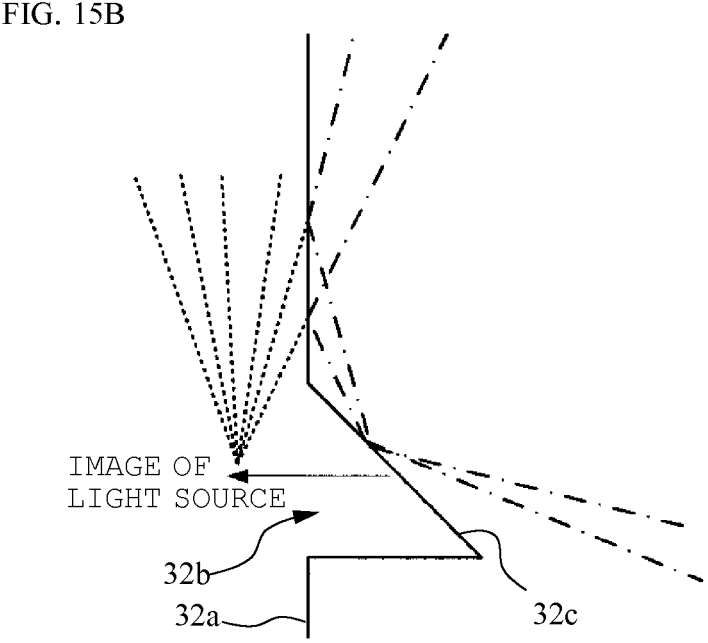

As shown in FIG. 2 of the first embodiment, the most simple and compact reticle unit 30 using the total reflection is configured to direct the light (source light) of the light source 33 from the direction (y axis direction) right above the reflector 32 and to guide the light toward the eye. The light collector 34 collects the source light near the reflection surface 32*c* of the reflector 32, and the reflection surface 32*c* totally reflects the light once to guide the light toward the eye. In this way, a bright dot image can be realized. However, the actual size (size of the light emission surface) of the light source 33 is finite as shown in FIG. 14. Therefore, the light emitted from the point on the optical axis (first optical axis) of the light source 33 is collected on the reflection surface 32*c* as shown in FIG. 15(*a*). On the other hand, as shown in FIG. 15(*b*), part of the light that is emitted from a point outside of the optical axis of the light source 33 and collected at a certain image height is totally reflected by the side flat surface (object side surface 32*a*) of the reflector 32, and there are two total reflections in total including the total reflection by the reflection surface 32*c*. As a result, as shown in FIG. 14, each of the light guided toward the eye by one reflection in total and the light guided toward the eye by two reflections in total forms two exit pupil images. The exit pupil image is equivalent to the shape of the luminous flux at the eye point position. These two exit pupil images approach, separate, or overlap depending on the alignment accuracy, such as shift and tilt of the light source 33, the light collector 34, and the reflector 32. This phenomenon causes a problem that the intensity of the dot positioned at the center of the reticle significantly changes according to the position of the eye of the observer. The changes and variations in the intensity cause individual differences of the product depending on the alignment accuracy, and this is problematic. If there is a phenomenon in the rifle scope that the changes in the intensity of the dot image cause a parallax between the target object and the dot image without the correction of the spherical aberration of the eyepiece optical system, the shooter may misjudge the position relative to the target object.

Figure 16A:
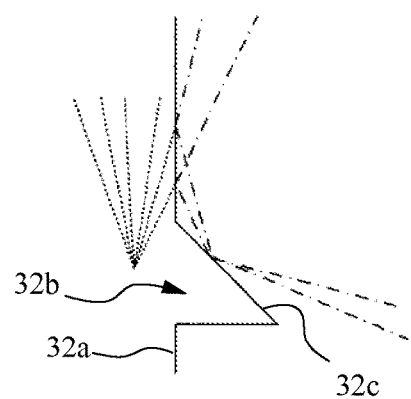
FIG. 16 is an explanatory view for explaining a reticle unit according to a seventh embodiment, (a) showing the reflection surface of the reticle unit according to the first embodiment, (b) showing a reflection surface according to the seventh embodiment.
Figure 16B:
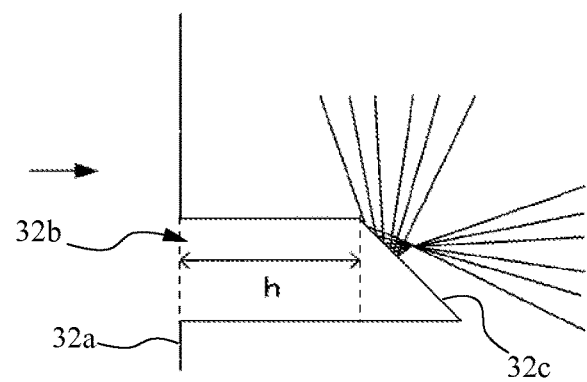
Figure 17A:
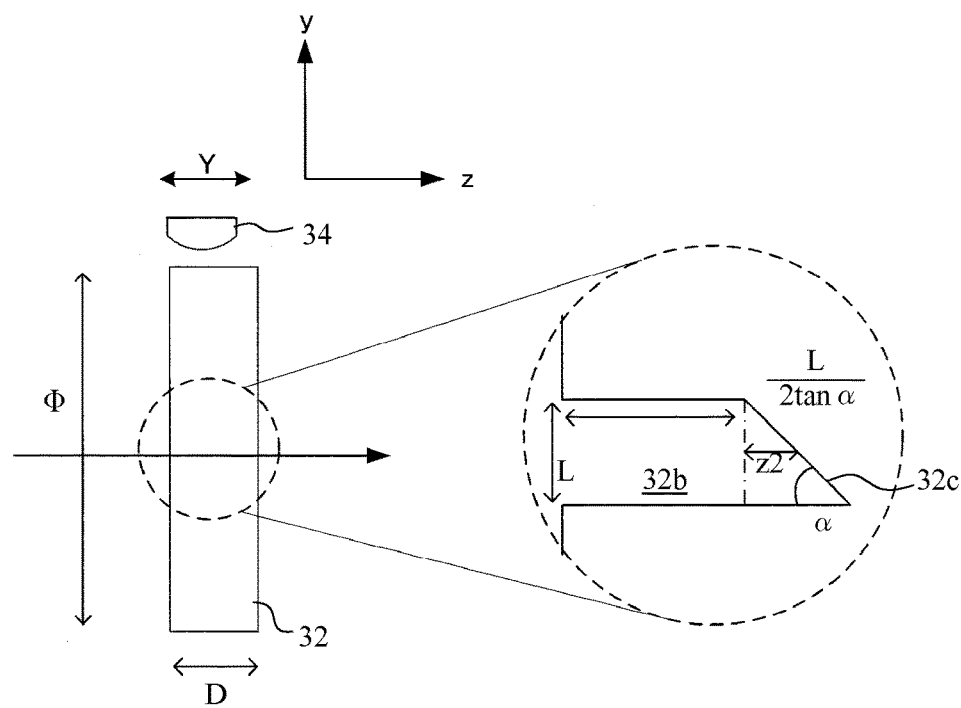
FIG. 17 is an explanatory view for explaining a conditional expression for forming the reticle unit according to the seventh embodiment, (a) showing the entire reticle unit, (b) showing the reflection surface.

As described, of the source light emitted from the light source 33, the light reflected by the object side surface 32*a* of the reflector 32 and reflected by the reflection surface 32*c* as shown in FIG. 16(*a*) causes the changes in the intensity of the image (dot image) of the light source 33. Therefore, as shown in FIG. 16(*b*), the changes in the intensity can be prevented by forming the reflection surface 32*c* separately from the object side surface 32*a*. Hereinafter, a distance (will be called "depth of the reflection surface 32*c*") in the optical axis direction (z axis direction) from the object side surface 32*a* to the edge portion of the reflection surface 32*c* closest to the object will be referred to as h, and an optimal range of h will be described. In the following description, as shown in FIG. 17, a diameter (size in the y axis direction) of the reflector 32 will be referred to as Φ, a thickness (thickness in the z axis direction) of the reflector 32 will be referred to as D, an inclination angle (angle formed with the optical axis of the riflescope 30) of the reflection surface 32*c* will be referred to as α, a height (y axis direction height) of the reflection surface 32*c* is referred to as L, a size (diameter in the z axis direction) of the light source 33 is referred to as Y, a magnification of the light collector 34 is referred to as β, and an angle formed by the optical axis of the light collector 34 and the normal line of the reflection surface 32*c* will be referred to as δ.

A condition that the image (image of light source) of the light source 33 formed by the light collector 34 does not reach the side surface (object side surface 32*a*) of the reflector 32 will be described with reference to FIG. 18. The size of the image of the light source 33 with the diameter Y is Y·β at the magnification β of the light collector 34. Therefore, if a point where the light emitted from the point on the optical axis of the light source 33 is collected by the light collector 34 is referred to as P1, the point P1 is at the center of the image of the light source 33, and the distance from the point P1 to an edge portion P2 on the side of the object side surface 32*a* in the image of the light source 33 is Y·β/2. If the light collection point of the light collector 34 is arranged to coincide with the point P1 on the reflection surface 32*c*, the point P1 is equivalent to the point P in FIG. 4. The angle formed with the optical axis (z axis) from the point P1 to the point P2 is α−δ. Therefore, a distance z1 in the z axis direction from the center P1 of the image of the light source to the edge portion P2 of the image of the light source is Y·β/2·cos(α−δ). A distance z2 in the z axis direction from the center of the reflection surface 32*c* to the edge portion of the reflection surface 32*c* is L/(2 tan α) (shown in FIG. 17(*a*)). Therefore, the distance in the z axis direction from the object side surface 32*a* to the center of the reflection surface 32*c*, that is, from the object side surface 32*a* to the center of the light source 33, can be separated in the z axis direction to prevent the edge portion P2 of the image of the light source 33 from reaching the object side surface 32*a*. As is clear from FIG. 18, the distance z1 in the z axis direction between the center of the reflection surface 32*c* and the object side surface 32*a* can be greater than the radius of the image of the light source 33. Therefore, the depth h of the reflection surface 32*c* can satisfy the condition of the following expression (7). Since the distance (h+z2) from the point P1 to the point O where the optical axis Z of the rifle scope 50 and the object side surface 32*a* of the reflector 32 intersect is equivalent to w described in second to fourth examples, the expression (7) can also be adapted to an optical system with a plurality of times of reflections as in the second to fourth examples.

[Expression 13]

$$\frac{Y}{2} \cdot \beta \cdot \cos(\alpha - \delta) - \frac{L}{2\tan\alpha} < h \qquad (7)$$

On the other hand, if the depth (distance from the object side surface 32a in the z axis direction) h of the reflection surface 32c is too large, the source light entered from the edge portion on the image side of an end face 32d on the side of the light source 33 of the reflector 32 cannot enter the reflection surface 32c, and the amount of light of the spot image is reduced. A condition that the source light entered from the end face 32d of the reflector 32 directly enters the reflection surface 32c will be described with reference to FIG. 19.

Figure 18:
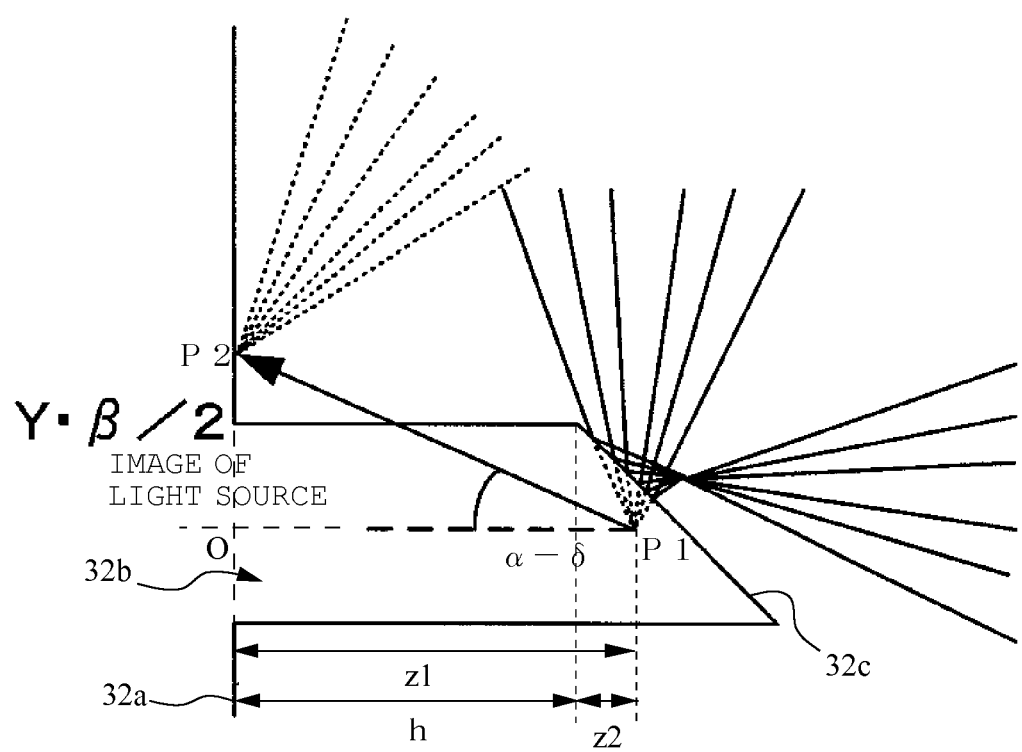
FIG. 18 is an explanatory view for explaining a lower limit of the conditional expression.
Figure 19:
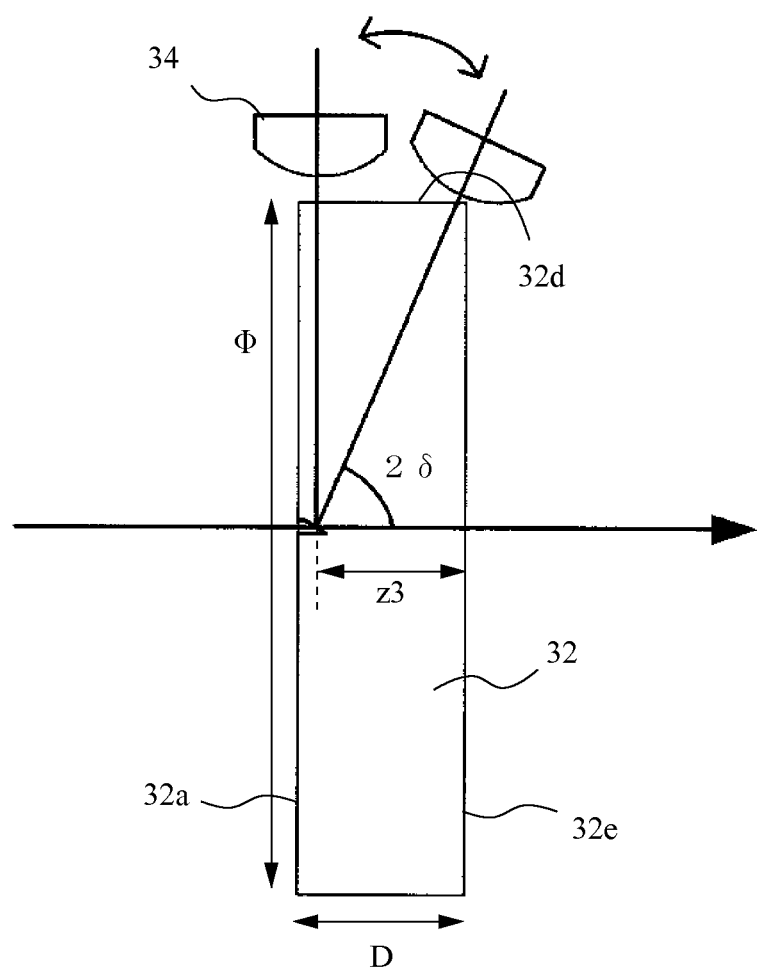
FIG. 19 is an explanatory view for explaining an upper limit of the conditional expression.

As shown in FIG. 19, a distance (distance in the z axis direction) z3 from an image side surface 32e of the reflector 32 to the center of the reflection surface 32c in the optical axis Z of the light entered from the edge portion closest to the image in the source light entered from the end face 32d on the side of the light source 33 of the reflector 32 is Φ/(2 tan(2δ)). The width z2 in the z axis direction from the center of the reflection surface 32c to the edge portion is expressed by L/(2 tan α) as described above (shown in FIG. 18(a)). Thus, the depth h of the reflection surface 32c can satisfy the condition of the following expression (8) in order to cause the light to directly enter the reflection surface 32c without being totally reflected by the object side surface 32a even once.

[Expression 14]

$$h < D - \frac{\Phi}{2\tan(2\delta)} - \frac{L}{2\tan\alpha} \qquad (8)$$

According to the expressions (7) and (8), the depth h of the reflection surface 32c of the reflector 32 can satisfy the condition of the following expression (9) to prevent the changes in the intensity of the dot image.

[Expression 15]

$$\frac{y}{2} \cdot \beta \cdot \cos(\alpha - \delta) - \frac{L}{2\tan\alpha} < h < D - \frac{\Phi}{2\tan(2\delta)} - \frac{L}{2\tan\alpha} \qquad (9)$$

Figure 17B:
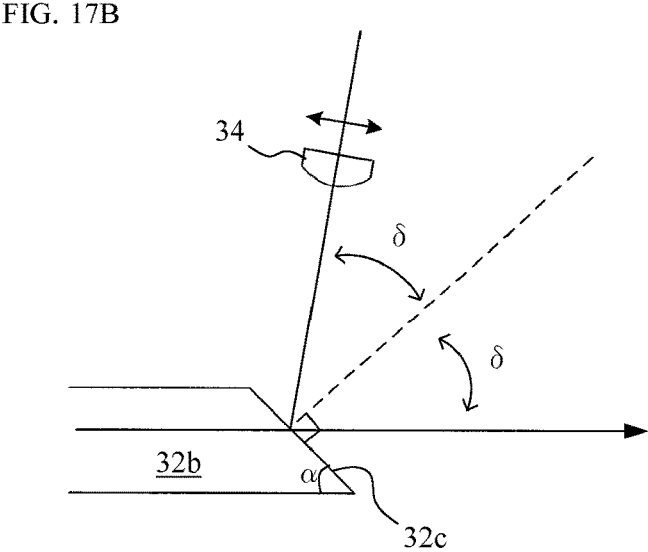

As shown in FIG. 17(b), an inclination angle (angle formed with the optical axis) of the reflection surface 32c is defined as α, and an angle formed by the optical axis of the light collector 34 and the normal line of the reflection surface 32c is defined as δ. Therefore, the angles have a relationship of the following expression (10).

[Expression 16]

$$\delta = 90° - \alpha \qquad (10)$$

Figure 20:
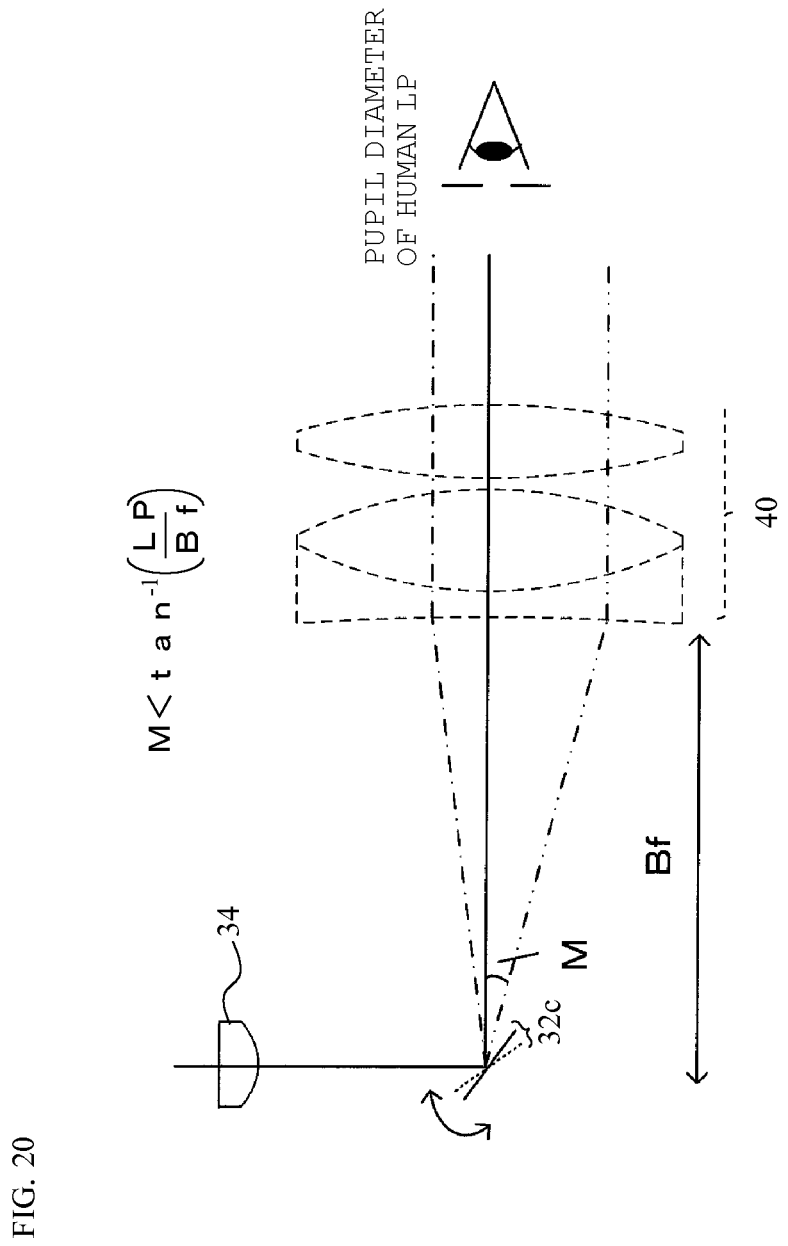
FIG. 20 is an explanatory view for explaining a tilt of the reflection surface and a condition for the luminous flux to enter the eye of an observer.

When the optical axis (optical axis of the light collection optical system) of the light collector 34 is deviated by the tilt of the reflection surface 32c, a condition that the light (dot image) reflected by the reflection surface 32c enters the eye when the eye is placed on the eye point on the optical axis of the rifle scope 50 will be considered. As shown in FIG. 20, if a pupil diameter of the eye of the observer is referred to as LP, and a distance (back focus) on the optical axis from the reflection surface 32c to the surface of the eyepiece 40 closest to the object is referred to as Bf, a maximum value (maximum angle) M of the light entering the eye of the observer in the angle formed by the light reflected by the reflection surface 32c and the optical axis of the rifle scope 50 has a relationship of M<tan$^{-1}$ (LP/Bf). More specifically, if the pupil diameter LP of the observer is 3 mm, and the back focus Bf of the eyepiece 40 is 30 to 40 mm, the maximum angle M is 1.71 to 2.86°. Therefore, if the maximum angle M can be controlled within 2°, there is no practical problem.

It is desirable that the maximum outer diameter φ of the light collector 34 has a relationship of the following expression (11) to cause the source light from the light source 33 to enter the entire area of the reflection surface 32c. In this case, it is desirable that the inclination angle α of the reflection surface 32c is 45°.

[Expression 17]

$$\phi > D - \frac{\Phi}{2\tan(2\delta)} - \frac{L}{2\tan\alpha} - h \qquad (11)$$

Two examples of the reticle unit 30 according to the seventh embodiment will be described.

First Example

Figure 21:
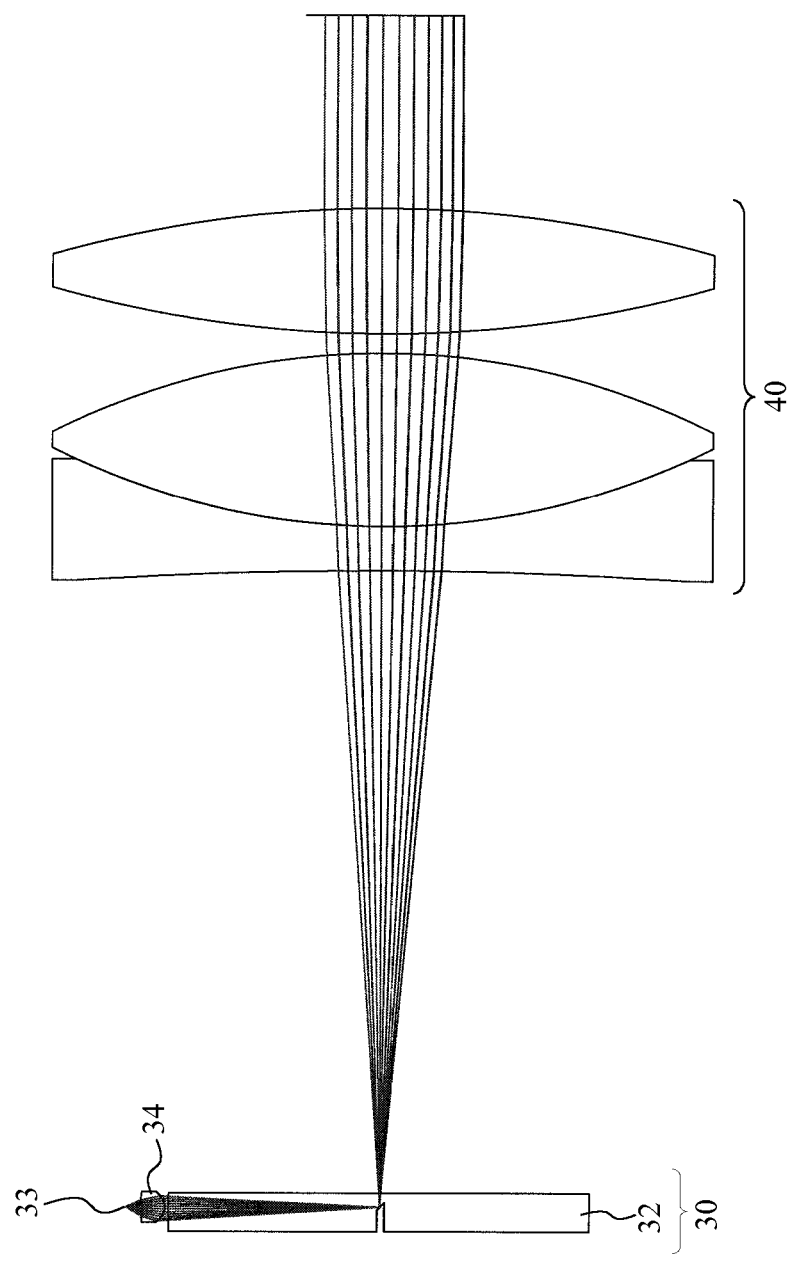
FIG. 21 is an explanatory view showing a trajectory of a dot image based on the reticle unit in a first example of the seventh embodiment.
Figure 22:
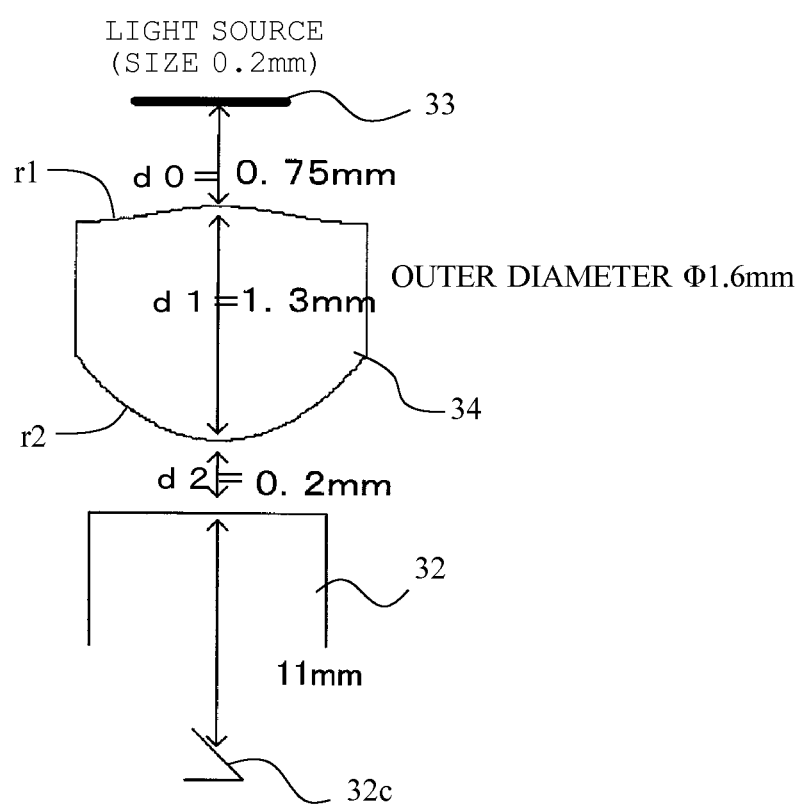
FIG. 22 is an explanatory view showing a relationship between the light source, the light collector, and the reflection surface in the first example of the seventh embodiment.

In a first example of the seventh embodiment, a case in which the angle formed by the reflection surface 32c and the optical axis of the rifle scope 50 is 45°, and the optical axis of the light collector 34 is orthogonal to the optical axis of the rifle scope 50, that is, a case in which the inclination angle α of the reflection surface 32c is 45°, and the angle δ formed by the optical axis of the light collector 34 and the normal line of the reflection surface 32c is 45° will be described with reference to FIGS. 21 and 22. The following table 6 shows specifications of the reticle unit 30 according to the first example illustrated in FIGS. 21 and 22. The meaning of the reference numerals is as described above. The origin of the apex coordinates is the point O where the optical axis of the rifle scope 50 and the object side surface 32a of the reflector 32 intersect, as described above with reference to FIG. 4. The shapes of the lens surfaces (r1, r2) of the light collector 34 are expressed by the constants of the aspheric surface expression (a). In the following table 6, d0 denotes a distance on the optical axis from the light source 33 to the r1 surface of the light collector 34, d1 denotes a distance on the optical axis from the r1 surface to the r2 surface of the light collector 34, and d2 denotes a distance from the r2 surface to the end face of the reflector 32. The description of the reference numerals is also applied in the following second example.

TABLE 6

| Data of reflector 32 |
| --- |
| α = 45° |
| D = 2 mm |
| Φ = 22 mm |

TABLE 6-continued

L = 0.1 mm
h = 0.95 mm
Material of reflector 32 nC = 1.4874    nd = 1.4899
Light source 33

Y = 0.2 mm
Data of light collector 34

β = 5.52
δ = 45°
φ = 1.6 mm
d0 = 0.75 mm
d1 = 1.30 mm
d2 = 0.20 mm
Shape of r1 surface of light collector 34

R = 1.27539
k = −7.952766
A4 = −0.336420E−00    A6 = 0.223648E−00
Apex coordinates of r1 surface of light collector 34

(1, 12.5)
Shape of r2 surface of light collector 34

R = −0.74864
k = −0.664279
A4 = 0.242014E−01    A6 = −0.167831E−01    A8 = −0.254090E−01
A10 = −0.733403E−02
Material of light collector 34 nC = 1.4874    nd = 1.4899
Condition corresponding values (conditional expression (9))

h lower limit = 0.502
h upper limit = 1.950

If the reticle unit 30 according to the first example is formed as described above, the depth h of the reflection surface 32c satisfies the conditional expression (9). As shown in FIG. 21, the changes in the intensity of the dot image can be prevented, and a bright image can be obtained.

Second Example

Figure 23:
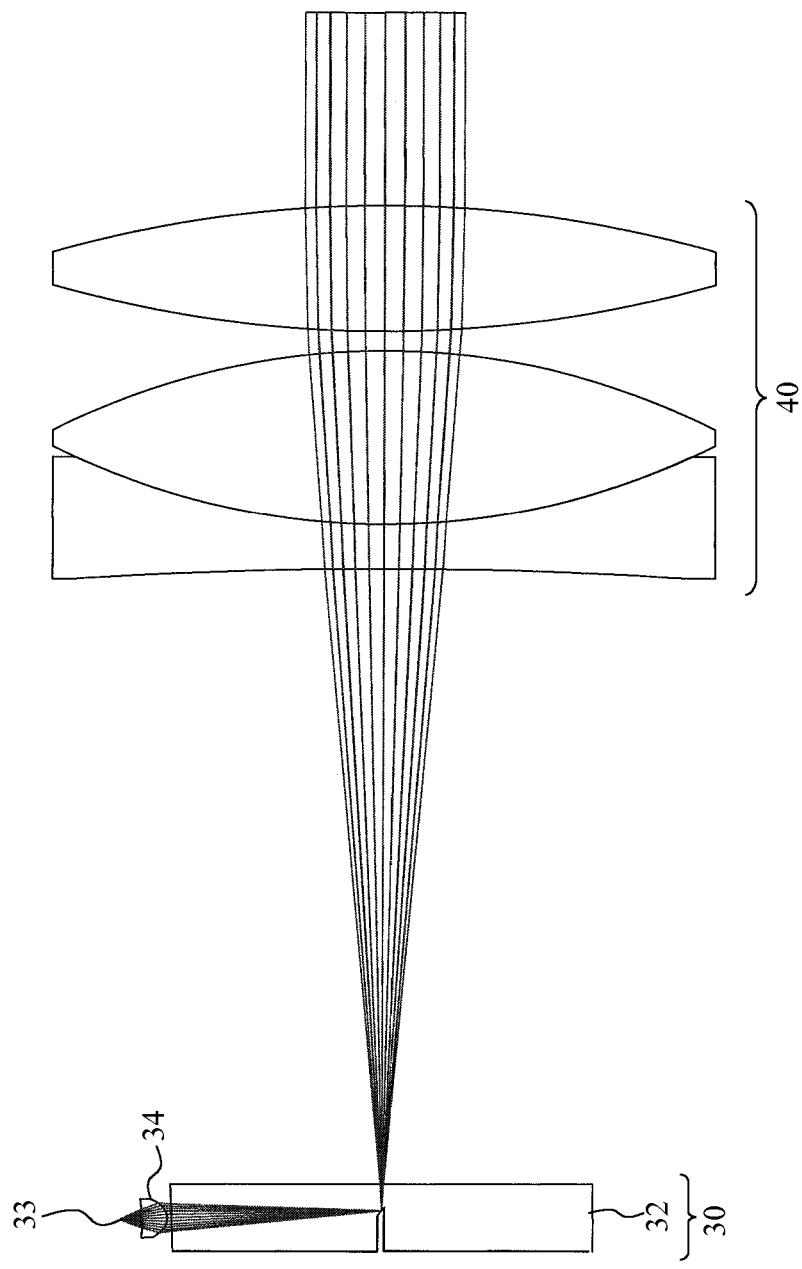
FIG. 23 is an explanatory view showing a trajectory of a dot image based on the reticle unit in a second embodiment of the seventh embodiment.
Figure 24:
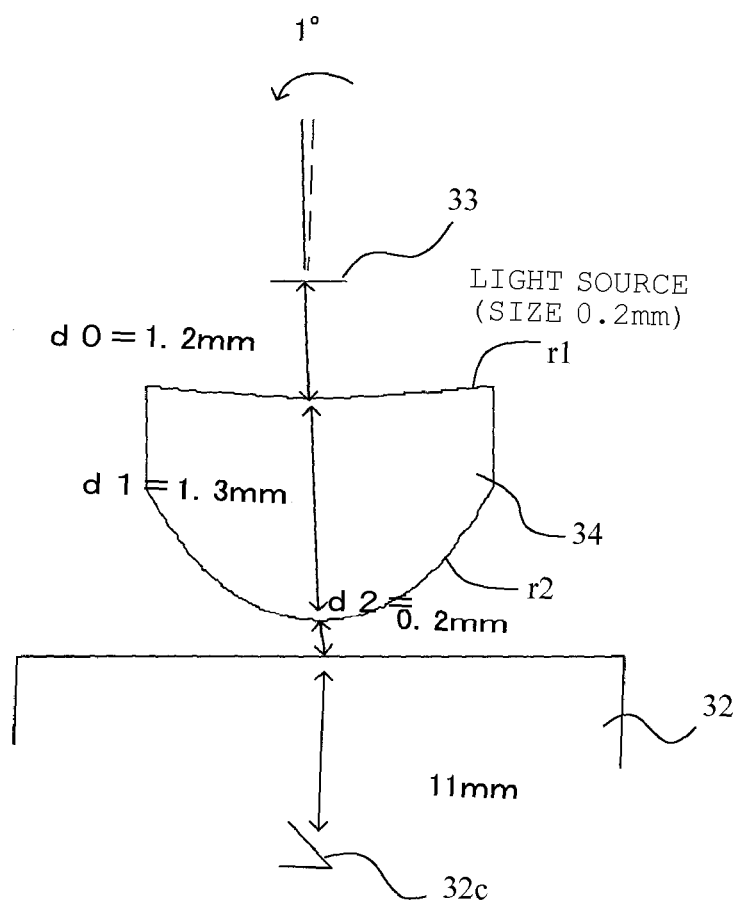
FIG. 24 is an explanatory view showing a relationship between the light source, the light collector, and the reflection surface in the second embodiment of the seventh embodiment.

A second example of the seventh embodiment describes a case in which the inclination angle of the reflection surface 32c is 44°, and the optical axis of the light collector 34 is tilted 1° from the first example, as shown in FIGS. 23 and 24. In this case, since the inclination angle α of the reflection surface 32c is 44°, the angle δ formed by the optical axis of the light collector 34 and the normal line of the reflection surface 32c is 46° (that is, tilted 1° from the first example) based on the expression (10). The following table 7 shows specifications of the reticle unit 30 in the second example.

TABLE 7

Data of reflector 32

α = 44°
D = 3.5 mm
Φ = 22 mm

TABLE 7-continued

L = 0.1 mm
h = 2.082352 mm
Material of reflector 32 nC = 1.4874    nd = 1.4899
Light source 33

Y = 0.2 mm
Data of light collector 34

β = 3.43
δ = 46°
φ = 1.6 mm
d0 = 1.20 mm
d1 = 1.30 mm
d2 = 0.20 mm
Shape of r1 surface of light collector 34

R = −4.12897
k = 6.782755
A4 = 0.659385E−01    A6 = −0.568693E−02
Apex coordinates of r1 surface of light collector 34

(1.697, 12.499)
Shape of r2 surface of light collector 34

R = −0.74774
k = −0.784996
A4 = −1.77740E−01    A6 = −0.304866E−01    A8 = 0.102173E−01
A10 = −0.100372E−01
Material of light collector 34 nC = 1.4874    nd = 1.4899
Condition corresponding values (conditional expression (9))

h lower limit = 0.291014538
h upper limit = 3.832351949

If the reticle unit 30 according to the second example is formed as described above, the depth h of the reflection surface 32c satisfies the conditional expression (9). As shown in FIG. 23, the changes in the intensity of the dot image can be prevented, and a bright image can be obtained.

Eighth Embodiment

The diameter of the exit pupil is large in the rifle scope 50 for gun sight, and the bright spot based on the reticle unit needs to be viewed regardless of the position of the pupil of the eye in the exit pupil. Therefore, to adopt the reticle unit to the rifle scope 50, a divergence angle from the bright spot (dot image as an image of the light source) on the reticle needs to be large on some level.

If the reflector with the reflection surface as described above is arranged for the reticle of the rifle scope 50, and the collected luminous flux based on the light source and the light collector (hereinafter, called "light source unit") is directed to the reflection surface, a bright spot with a divergence angle can be obtained. However, when the collected light source is used, the reflection surface and the collection position of the light source need to be properly matched. More specifically, the position in the three axis directions and the tilt around the two axes need to be adjusted relative to the reflection surface of the reflector formed on the reticle surface in the light source unit, and the adjustment in the manufacturing is burdensome. Considering a case of using a reflection surface made of a 45° flat surface and directing a collected luminous flux from the direction orthogonal to the optical axis of the optical system of the rifle scope 50, the pupil shape of the bright spot is asymmetrical when viewed from the side of the eye point, as a result of the limitation of the divergence angle of the ray in the directed surface due to the critical angle. To make the angle of divergence vertically symmetrical, an angle other than 45° can be selected for the angle of the reflection surface to cause the light to enter the reflection surface at a shallow angle as described in the second to fourth embodiments. However, a problem still remains that the adjustment is difficult. Therefore, an eighth embodiment describes a configuration of forming a bright dot image without forming the image of the light source on or near the reflection surface of the reflector.

Figure 25B:
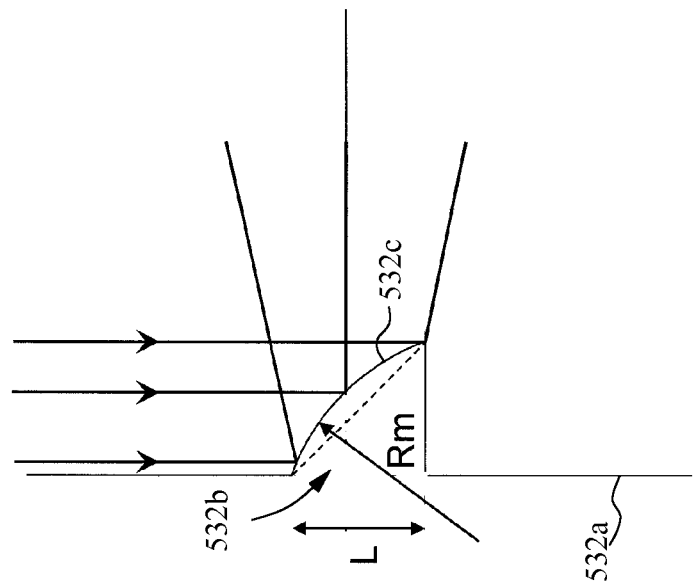
FIG. 25 is an explanatory view for explaining a reticle unit according to an eighth embodiment, (a) showing a side view of the reticle unit, (b) showing an enlarged view of main parts.
Figure 25A:
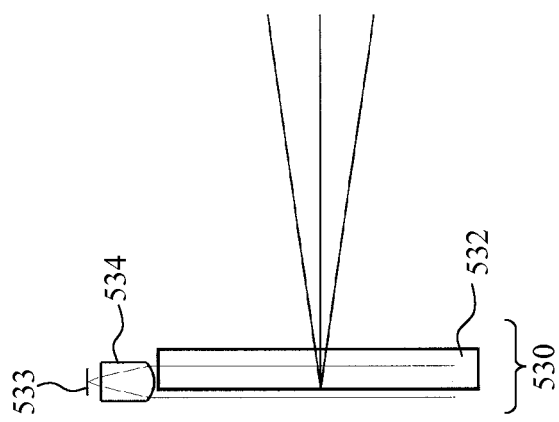
Figure 26C:
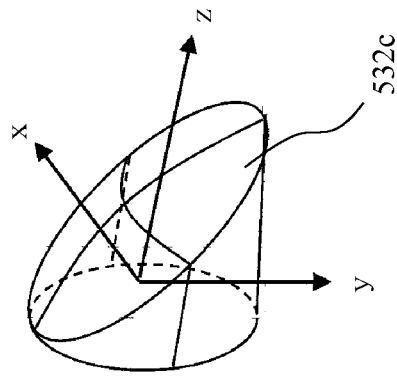
FIG. 26 is an explanatory view for explaining a shape of a reflection surface of the reticle unit according to the eighth embodiment, (a) showing a side view, (b) showing a front view, (c) showing a perspective view.
Figure 26B:
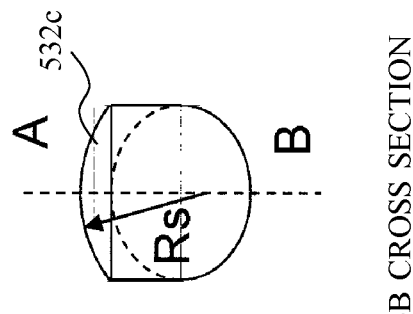
Figure 26A:
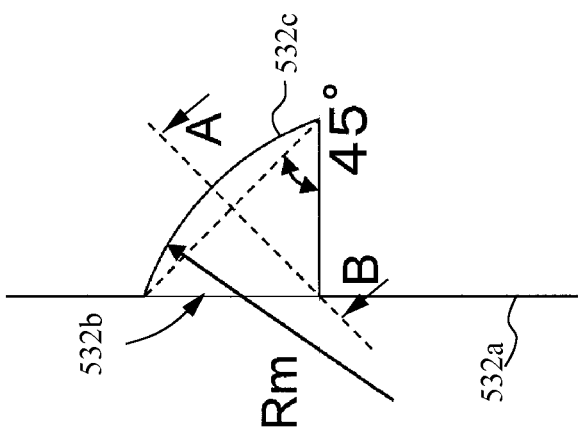

A configuration of a reticle unit 530 according to the eighth embodiment will be described with reference to FIGS. 25 and 26. The reticle member is omitted in the reticle unit 530. The reticle unit 530 includes: a light source 533; a reflector 532 provided with a concave portion 532b that opens toward the object at a substantially central portion of an object side surface 532a, wherein part of the concave portion 532b is formed in a convex shape toward the light source 533 to constitute a reflection surface 532c; and a light collector 534 that converts light from the light source 533 to a substantially parallel light flux to guide the flux to the reflection surface 532c of the reflector 532 (the light source 533 and the light collector 534 will be collectively called a "light source unit"). As in the embodiments so far, the reflector 532 is arranged so that the reflection surface 532c includes the optical axis Z of the rifle scope 50. The light source unit including the light source 533 and the light collector 534 is arranged laterally to the reflector 532 and is arranged to direct the substantially parallel light flux to the reflection surface 532c from the direction substantially orthogonal to the optical axis Z. The light collector 534 is formed by a condenser lens. In the following description, a plane including the optical axis of the rifle scope 50 and the optical axis of the light source unit (light collection optical system) will be called a meridional plane, and a surface orthogonal to the meridional plane and orthogonal to a tangent plane of the apex of the reflection surface 532c will be called a sagittal plane.

In this way, curvature is provided to the reflection surface 532c by forming a convex shape toward the image. The light source 533 is a generally used point light source, and the light collector 534 forms a substantially parallel light flux. Therefore, the light can be reflected toward the eye point at a proper divergence angle. As a result, a dot image (bright spot) with a proper divergence angle can be displayed in the pupil of the optical system of the rifle scope 50. Since the source light exiting from the light collector 534 is a substantially parallel light flux, positioning of the light source 533 as well as the light collector 534 and the reflector 532 is easier than when the point image of the light source is positioned on the reflection surface, and the adjustment in the manufacturing is easy in the reticle unit 530.

When a point light source is used as the light source 533 to form a substantially parallel light flux by the light collector 534, the diameter of the substantially parallel light flux can be assumed to be equal to the effective diameter of the light collector 534. Therefore, if the effective diameter of the light collector 534 is sufficiently greater than the reflection surface 532c, that is, if the luminous flux diameter is greater than the reflection surface 532c, substantially only the tilt of the light source unit needs to be adjusted to position the light source 533 as well as the light collector 534 (light source unit) and the reflector 532, and a pupil shape of a dot image (bright spot) with excellent symmetry can be easily obtained when viewed from the side of the eye point. As a result, the adjustment in the manufacturing is easy in the reticle unit 530.

It is desirable that the shape of the reflection surface 532c is a toroidal surface in which the curvature is different between the meridional plane and the sagittal plane. In this case, it is desirable that the radius of curvature in the meridional plane is greater than the radius of curvature in the sagittal plane and that the intersection of the meridional plane and the sagittal plane is tilted about 45° relative to the optical axis of the rifle scope 50 (so that the convex surface faces the light source unit).

In the reticle unit 530, the divergence angle of the light reflected by the reflection surface 532c is geometrically determined by the radius of curvature of the reflection surface 532c. If the radius of curvature is reduced to increase the divergence angle from the reflection surface 532c, the total reflection condition is gradually not satisfied from the inside of the surface (inside of the meridional plane) including the optical axis of the light source unit and the optical axis of the rifle scope 50, and a pupil shape of a symmetrical bright spot cannot be obtained. More specifically, the maximum divergence angle is limited by the total reflection condition of the reflection surface 532c. On the other hand, the incident angle is large in the surface orthogonal to the optical axis of the light source unit, and the total reflection condition can be satisfied. However, the divergence angle is small. Therefore, to obtain a pupil shape with excellent vertical and horizontal symmetry when viewed from the side of the eye point of the rifle scope 50 while obtaining the maximum divergence angle, the radius of curvature needs to be different between the meridional plane and the sagittal plane in the reflection surface 532c. As a result of the shape of the reflection surface 532c, the reticle unit 530 can have a pupil shape of a dot image (bright spot) with excellent vertical and horizontal symmetry when viewed from the side of the eye point and can have a large divergence angle.

It is desirable that the shape of the reflection surface 532c satisfies the following conditional expressions (12) and (13), wherein a radius of curvature in the meridional plane is referred to as Rm, a radius of curvature in the sagittal plane is referred to as Rs, a refractive index of the medium of the reflector 532 is referred to as n, and a diameter (height in the y axis direction) of the reflection surface 532c is referred to as L.

[Expression 18]

$$\sin^{-1}\left(-\frac{L}{\sqrt{2} \cdot Rm}\right) + \frac{\pi}{4} > \sin^{-1}\left(\frac{1}{n}\right) \quad (12)$$

$$\tan^{-1}\left(\frac{L}{\sqrt{4Rs^2 - L^2}}\right) = -\sin^{-1}\left(-\frac{L}{\sqrt{2} \cdot Rm}\right) \quad (13)$$

The following table 8 shows specifications of the reticle unit 530 as an example of the eighth embodiment. In the following table 8, the light collector 534 is constituted by one condenser lens, r denotes a radius of curvature of each optical surface of the light collector 534, d denotes a distance on the optical axis from each optical surface to the next optical surface, and nC denotes a refractive index of the material of the light collector 534 relative to the C line. Surface numbers of the light collector 534 are lined up in the order of a first surface and a second surface from the side of the light source 533. The distance d shown in the light source denotes a distance on the optical axis from the light source 533 to the first surface of the light collector 534. In the eighth embodiment, the second surface of the light collector 534 is formed in an aspheric shape, and the shape of the second surface is expressed by the radius of curvature R and the conic constant k in the aspheric surface expression (a) (coefficient of aspheric surface A4 to A10 are all 0).

TABLE 8

Shape of light source unit

|  | r | d | nC |
|---|---|---|---|
| Light source | ∞ | 0.05 | |
| 1 |  | 4.8 | 1.4885 |
| *2 | −1.6 | | |

Aspheric surface data

| Second surface | R = −1.6 |
|---|---|
| | k = −0.454 |

Material of reflector 532 nc = 1.5796

Height of first optical axis direction of reflection surface 532c

L = 0.1

Shape of reflection surface 532c

Rm = 0.71
Rs = 0.50

If the light source unit (the light source 533 and the light collector 534) and the reflector 532 are formed as described above, the reticle unit 530 can have a pupil shape of a dot image (bright spot) with excellent vertical and horizontal symmetry when viewed from the side of the eye point and can have a large divergence angle, as shown in FIG. 27.

Ninth Embodiment

In the reticle unit 530 according to the eighth embodiment, the light from the light source 533 is converted to a substantially parallel light flux by the light collector 534 and guided to the reflection surface 532c of the reflector 532, and the light is reflected toward the eye point by the reflection surface 532c in the toroidal shape with the curvature different between the meridional plane and the sagittal plane in the case described above. However, the function of adjusting the divergence angle of the dot image to a proper size may be shared by the light collector and the reflection surface. Hereinafter, a configuration of a reticle unit 630 according to a ninth embodiment will be described with reference to FIGS. 28 and 29.

The reticle unit 630 according to the ninth embodiment also includes: a light source 633; a reflector 632 provided with a concave portion 632b that opens toward the object at a substantially central portion of an object side surface 632a, wherein part of the concave portion 632b is formed in a convex shape toward the light source 633 to constitute a reflection surface 632c; and a light collector 634 that converts light from the light source 633 to a substantially parallel light flux to guide the flux to the reflection surface 632c of the reflector 632 (the light source 633 and the light collector 634 will be collectively called "light source unit"). The reticle member is also omitted in the reticle unit 630. As in the eighth embodiment, the reflector 632 is arranged so that the reflection surface 632c includes the optical axis Z of the rifle scope 50. The light source unit including the light source 633 and the light collector 634 is arranged laterally to the reflector 632 and is arranged to direct the substantially parallel light flux to the reflection surface 632c from the direction substantially orthogonal to the optical axis Z. The light collector 634 is formed by a condenser lens.

Figure 28B:
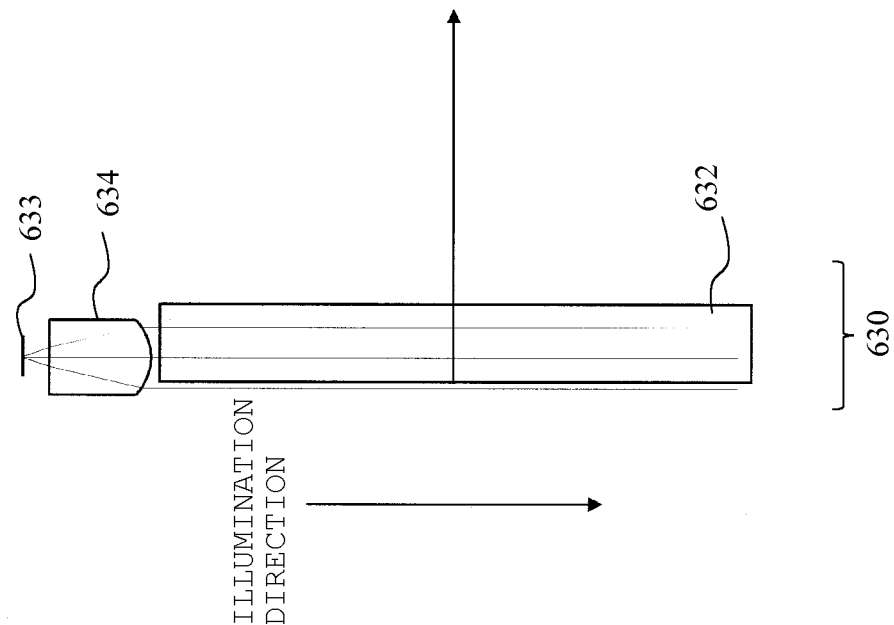
FIG. 28 is an explanatory view for explaining a reticle unit according to a ninth embodiment, (a) showing a front view, (b) showing a side view.
Figure 28A:
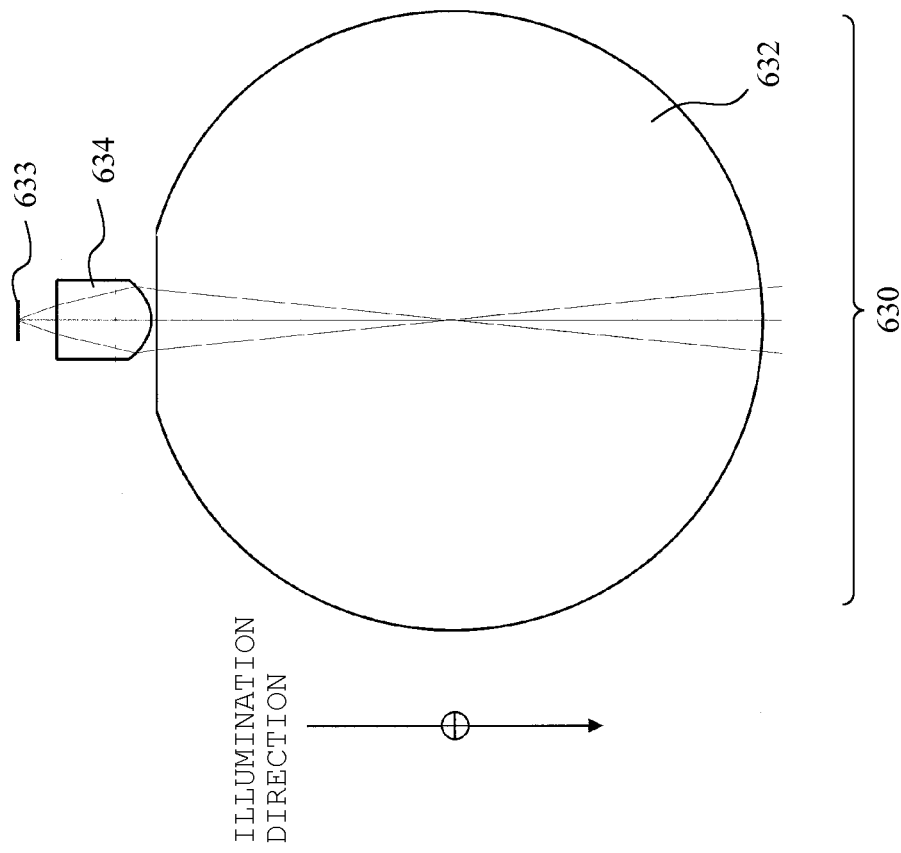
Figure 29C:
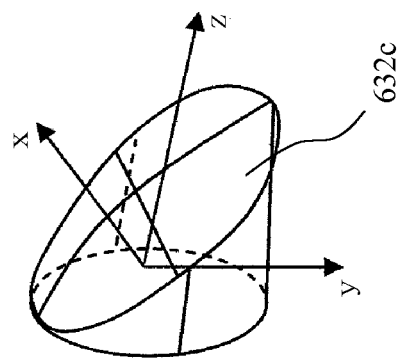
FIG. 29 is an explanatory view for explaining a shape of a reflection surface of the reticle unit according to the ninth embodiment, (a) showing a side view, (b) showing a front view, (c) showing a perspective view.
Figure 29B:
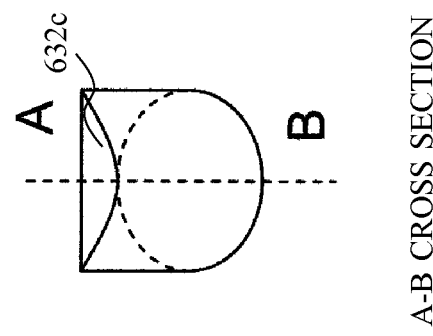
Figure 29A:
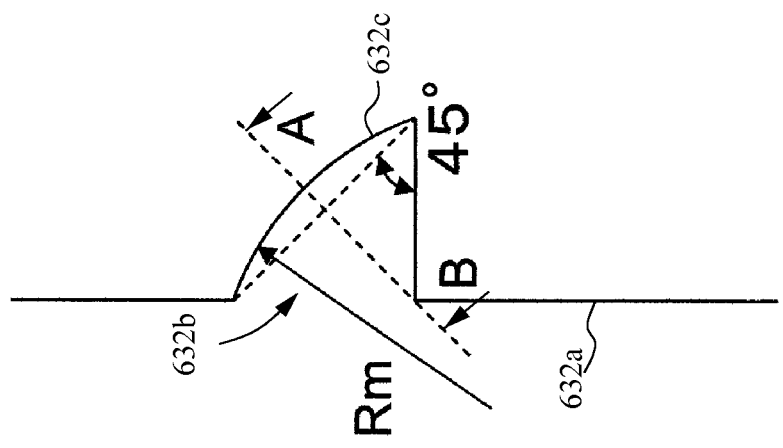

As shown in FIG. 28, the light collector 634 is configured to collect the light from the light source 633 to collect the light on or near the reflection surface 632c in the surface orthogonal to the optical axis of the rifle scope 50 and to convert the light from the light source 633 to a substantially parallel light flux to guide the light to the reflection surface 632c in the surface (in the meridional plane) including the optical axis of the light source unit and the rifle scope 50. If the light collector 634 that collects the light from the light source 633 in the plane orthogonal to the optical axis of the rifle scope 50 to convert the light to a substantially parallel light flux in the meridional plane is used, the solid angle for importing the source light flux viewed from the side of the reflection surface 632c is greater, and the dot image (bright spot) displayed by reflecting the light by the reflection surface 632c and placing the light and the reticle of the reticle member not shown on top of each other is brighter. Therefore, if the light source unit is included, a bright dot image (bright spot) can be displayed in the rifle scope 50, and the adjustment in the manufacturing is easy in the reticle unit 630.

The reflection surface 632c of the reflector 632 is a cylindrical surface with a curvature only in the meridional plane. The meridional plane includes the optical axis of the rifle scope 50 and the optical axis of the light source unit, and the intersection of the meridional plane and the sagittal plane is tilted about 45° relative to the optical axis of the rifle scope 50 (so that the convex surface faces the light source unit).

According to the light collector 634, the illumination light flux converged in the plane orthogonal to the optical axis of the rifle scope 50 is further diverged and exits by being deflected by the reflection surface 632c, if the convergent point is positioned near the reflection surface 632c. Meanwhile, in the meridional plane, the illumination light flux is diverged only by the effect of the convex surface of the reflection surface 632c. To obtain a symmetrical angle of divergence in the plane including the optical axis of the light source unit and the optical axis direction of the rifle scope 50, the angle of divergence is limited by the total reflection condition (determined by the material of the reflection surface 632c). Therefore, to form the symmetry while obtaining the maximum angle of divergence, the reflection surface 632c needs to have the curvature only in the plane parallel to the optical axis of the light source unit and the optical axis direction of the rifle scope 50. As a result of the shape of the reflection surface 632c, the reticle unit 630 can have a pupil shape of a bright spot with excellent vertical and horizontal symmetry when viewed from the side of the eye point and can have a large divergence angle.

In the reticle unit 630 according to the ninth embodiment, it is desirable that the shape of the reflection surface 632c satisfies the conditional expression (12), wherein a radius of curvature in the meridional plane is referred to as Rm. A radius of curvature Rs in the sagittal plane is ∞.

The following table 9 shows specifications of the reticle unit 630 in an example of the ninth embodiment. In the following table 9, the light collector 634 is formed by one condenser lens, r denotes a radius of curvature of each optical surface of the light collector 634, d denotes a distance on the optical axis from each optical surface to the next optical surface, and nC denotes a refractive index of the material of the light collector 634 relative to the C line.

Surface numbers of the light collector 634 are aligned in the order of the first surface and the second surface from the side of the light source 633. The distance d shown in the light source denotes the distance on the optical axis from the light source 633 to the first surface of the light collector 634. In the ninth embodiment, the second surface of the light collector 634 is formed in a shape of an anamorphic aspheric surface shown in the following expression (b). The shape of the second surface is expressed by the radius of curvature Ry of the reference spherical surface in the y axis direction in the aspheric surface expression (b) described above, the radius of curvature Rz of the reference spherical surface in the z axis direction, the conic constant ky in the y axis direction, and the conic constant kz in the z axis direction. In the anamorphic aspheric surface expression (b), S(y,z) denotes a distance (extent of aspheric surface or extent of sag) to a position on the aspheric surface at the position (y,z) from the tangent plane at the apex of the aspheric surface, along the optical axis of the light source unit (light collection optical system).

[Expression 19]

$$S(y, z) = \frac{\frac{y^2}{Ry} + \frac{z^2}{Rz}}{1 + \sqrt{1 - \frac{(1+ky)y^2}{Ry^2} - \frac{(1+kz)z^2}{Rz^2}}} \quad (b)$$

TABLE 9

| Shape of light source unit | | | |
|---|---|---|---|
| | r | d | nC |
| Light source 1 | | 0.05 | |
| *2 | ∞ | 4.8 | 1.4885 |
| Aspheric surface data | | | |
| Second surface | Ry = −1.6 | Rz = −1.055 | |
| | ky = −0.454 | kz = −0.83 | |
| Material of reflector 632 | | | |
| nc = 1.5796 | | | |
| Height of first optical axis direction of reflection surface 632c | | | |
| L = 0.1 | | | |
| Shape of reflection surface 632c | | | |
| Rm = 1.45 | | | |
| Rs = ∞ | | | |

If the light source unit (the light source 633 and the light collector 634) and the reflector 632 are formed as described above, the reticle unit 630 can have a pupil shape of a dot image (bright spot) with excellent vertical and horizontal symmetry when viewed from the side of the eye point and can have a large divergence angle.

Tenth Embodiment

Figure 30:
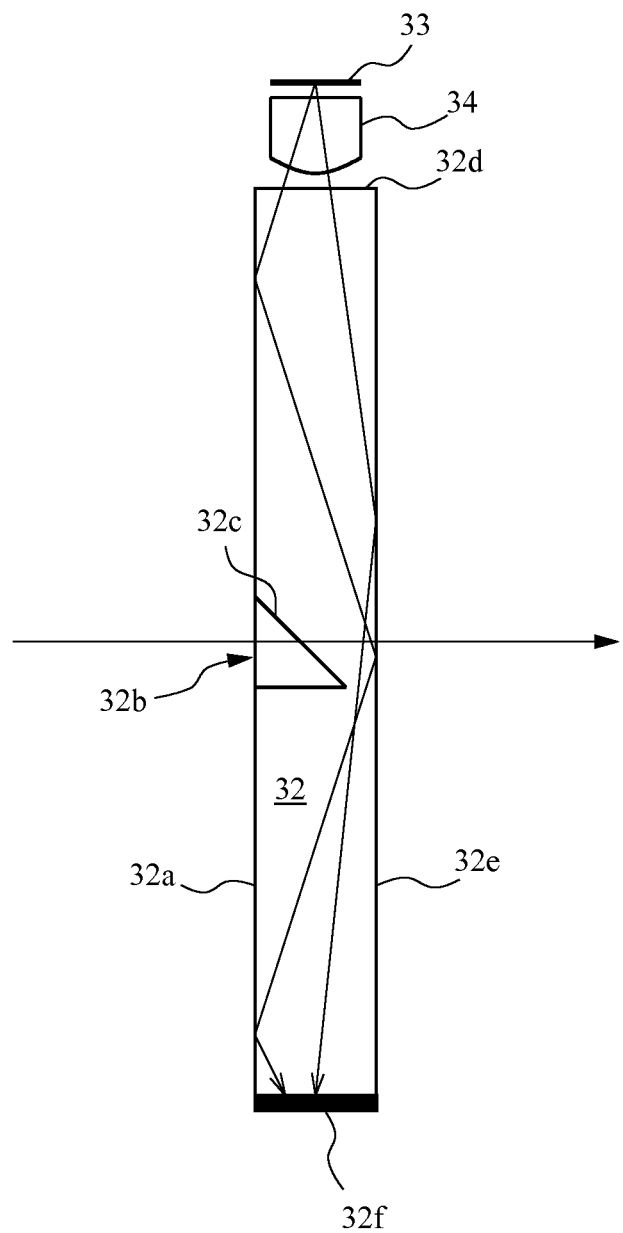
FIG. 30 is an explanatory view for explaining a configuration of a reflector of a reticle unit according to a tenth embodiment.

As described above, a reticle unit according to the present embodiment is configured to cause the illumination light from the side surface of the plate-like (for example, disc-shaped) reflector or the reticle member and to reflect the illumination light by the reflection surface formed on the reflector to guide the illumination light toward the eyepiece. As shown in FIG. 30, when the illumination light emitted from the light source 33 is collected by the collection portion 34 and enters from the end face 32*d* of the reflector 32, the illumination light not totally reflected by the reflection surface 32*c* of the concave portion 32*b* formed on the object side surface 32*a* of the reflector 32 repeats the total reflection between the object side surface 32*a* and the image side surface 32*e*, and the illumination light further reaches an end face 32*f* facing the end face 32*d* where the illumination light has entered. Part of the illumination light that repeats the reflection moves toward the eyepiece and becomes stray light. Therefore, the end face 32*f* facing the light source 33 can be blackened or can be a diffusing surface to absorb (or diffuse) the illumination light to thereby control the generation of the stray light. As described, the illumination light not totally reflected by the reflection surface 32*c* focuses on the opposing end face 32*f* in the configuration in which the illumination light enters from the end face 32*d* of the reflector 32. Therefore, the illumination light can be absorbed by the end face 32*f* to efficiently control the stray light.

REFERENCE SIGNS LIST

10 objective lens 40 eyepiece 50 rifle scope (optical instrument)
30, 130, 230, 330, 530, 630 reticle unit
31, 131, 231, 331 reticle member
32, 132, 232, 332, 432, 532, 632 reflector
32*b*, 132*b*, 232*b*, 332*b*, 532*b*, 632*b* concave portion 32*c*, 132*c*, 232*c*, 332*c*, 432*c*, 432*d*, 532*c*, 632*c* reflection surface
33, 133, 233, 333, 533, 633 light source
34, 134, 234, 334, 534, 634, light collector 432*b* groove portion

The invention claimed is:
1. A reticle unit comprising:
a reflector provided with a concave portion on one of surfaces of a plate-like optical member, wherein at least part of a side surface of the concave portion is a reflection surface;
a light source that is arranged laterally to the reflector and that emits light; and
a light collector that is arranged between the light source and the reflector and that collects the light from the light source onto a surface substantially parallel to the surface on which at least the concave portion is formed to form an image of the light source on or near the reflection surface, wherein
at least part of the light incident on the reflection surface is totally reflected by the reflection surface and the totally reflected light is exited from the reflector, and wherein
when an optical axis of the light source and the light collector is defined as a first optical axis, and an optical axis for reflecting the light by the reflection surface to exit the light from the reflector is defined as a second optical axis,
a condition of the following expression is satisfied, wherein
h denotes a depth in a direction of the second optical axis of the concave portion, Y denotes a diameter of the light source, β denotes a magnification of the light collector,

δ denotes an angle formed by the second optical axis and a normal line of the reflection surface, α denotes an angle formed by the second optical axis and the reflection surface, L denotes a height in a direction of the first optical axis of the reflection surface, D denotes a thickness in the direction of the second optical axis of the reflector, and Φ denotes an outer diameter in the direction of the first optical axis of the reflector:

$$\frac{y}{2} \cdot \beta \cdot \cos(\alpha - \delta) - \frac{L}{2\tan\alpha} < h < D - \frac{\Phi}{2\tan(2\delta)} - \frac{L}{2\tan\alpha}.$$

2. The reticle unit according to claim 1, wherein a condition of the following expression is satisfied:

δ=90°−α.

3. The reticle unit according to claim 1, wherein
a condition of the following expression is satisfied, wherein
φ denotes a maximum outer diameter of the light collector:

$$\phi > D - \frac{\Phi}{2\tan(2\delta)} - \frac{L}{2\tan\alpha} - h.$$

4. The reticle unit according to claim 1, wherein the angle α formed by the second optical axis and the reflection surface is 45°.

5. An optical instrument comprising:
an objective lens;
the reticle unit according to claim 1, wherein the reflection surface is arranged at a position of an image formed by the objective lens or at a position substantially conjugate to the image; and
an eyepiece for observation, wherein the image of the objective lens and the light exited from the reflection surface of the reticle unit are placed on top of each other.

6. A rifle scope comprising:
an objective lens;
the reticle unit according to claim 1, wherein the reflection surface is arranged at a position of an image formed by the objective lens or at a position substantially conjugate to the image; and
an eyepiece for observation, wherein the image of the objective lens and the light emitted from the reflection surface of the reticle unit are placed on top of each other.

7. A reticle unit comprising:
a reflector provided with a concave portion on one of surfaces of a plate-like optical member, wherein at least part of a side surface of the concave portion is a reflection surface;
a light source that is arranged laterally to the reflector and that emits light; and
a light collector that is arranged between the light source and the reflector and that collects the light from the light source onto a surface substantially parallel to the surface on which at least the concave portion is formed to form an image of the light source on or near the reflection surface, wherein
at least part of the light incident on the reflection surface is totally reflected by the reflection surface and the totally reflected light is exited from the reflector;
the reticle unit further comprising a reticle member provided with a reticle on one of the surfaces of the plate-like optical member,
wherein the reflector is arranged so that one of the surfaces of the reflector faces the surface provided with the reticle.

8. The reticle unit according to claim 7, wherein the light collector is made of a member different from the reflector and includes a light reflection collection surface in an aspheric shape.

9. The reticle unit according to claim 8, wherein inside of the reflector, the surface of the reflector provided with the concave portion totally reflects the light from the light source, and then the light enters the reflection surface.

10. The reticle unit according to claim 7, wherein the reticle member and the reflector are arranged to have an air space therebetween.

11. The reticle unit according to claim 7, wherein the reticle member and the reflector are arranged by bonding the opposing surfaces.

12. The reticle unit according to claim 8, wherein the light collector is bonded to a side of the reflector.

13. The reticle unit according to claim 7, wherein the light collector is bonded to a side of the reticle member.

14. The reticle unit according to claim 13, wherein inside of the reticle member, the light from the light source is totally reflected by one of the side surfaces of the reticle member, which is not adjacent to the reflector, to guide the light to the reflector.

15. The reticle unit according to claim 7, wherein at least two parts of the side surface of the concave portion are the reflection surfaces, and the reticle unit is provided with the light source and the light collector for each of the reflection surfaces.

16. The reticle unit according to claim 7, wherein the reflection surface is a flat surface.

17. The reticle unit according to claim 7, wherein the reflection surface is a curved surface convex toward the light source.

18. The reticle unit according to claim 7, wherein the reflector is formed of mold processing.

19. The reticle unit according to claim 7, wherein the reflector is formed of resin.

20. An optical instrument comprising:
an objective lens;
the reticle unit according to claim 7, wherein the reflection surface is arranged at a position of an image formed by the objective lens or at a position substantially conjugate to the image; and
an eyepiece for observation, wherein the image of the objective lens and the light exited from the reflection surface of the reticle unit are placed on top of each other.

21. A rifle scope comprising:
an objective lens;
the reticle unit according to claim 7, wherein the reflection surface is arranged at a position of an image formed by the objective lens or at a position substantially conjugate to the image; and
an eyepiece for observation, wherein the image of the objective lens and the light emitted from the reflection surface of the reticle unit are placed on top of each other.

22. A reticle unit comprising:
a reflector provided with a concave portion on one of surfaces of a plate-like optical member, wherein at least part of a side surface of the concave portion is a reflection surface;
a light source that is arranged laterally to the reflector and that emits light; and
a light collector that is arranged between the light source and the reflector and that collects the light from the light source onto a surface substantially parallel to the surface on which at least the concave portion is formed to form an image of the light source on or near the reflection surface, wherein
at least part of the light incident on the reflection surface is totally reflected by the reflection surface and the totally reflected light is exited from the reflector, and wherein
when an optical axis of the light source and the light collector is defined as a first optical axis, and an optical axis for reflecting the light by the reflection surface to exit the light from the reflector is defined as a second optical axis, the first optical axis and the second optical axis are substantially orthogonal.

23. The reticle unit according to claim 22, wherein
the light collector is a condenser lens that converts the light from the light source to substantially parallel light, and
the reflection surface is a curved surface convex toward the light source.

24. The reticle unit according to claim 22, wherein
the reflection surface is a toroidal surface in which curvatures are different between a meridional plane, which includes the first optical axis and the second optical axis, and a sagittal plane, which includes an optical axis of the reflection surface and which is perpendicular to the meridional plane, and the optical axis of the reflection surface is tilted substantially 45° relative to the second optical axis.

25. The reticle unit according to claim 24, wherein
the reflection surface satisfies a condition of the following expression, wherein
Rm denotes a radius of curvature in the meridional plane, Rs denotes a radius of curvature in the sagittal plane, n denotes a refractive index of a medium of the reflector, and L denotes a diameter in a direction of the first optical axis of the concave portion:

$$\sin^{-1}\left(-\frac{L}{\sqrt{2}\cdot Rm}\right) + \frac{\pi}{4} > \sin^{-1}\left(\frac{1}{n}\right)$$

$$\tan^{-1}\left(\frac{L}{\sqrt{4Rs^2 - L^2}}\right) = -\sin^{-1}\left(-\frac{L}{\sqrt{2}\cdot Rm}\right).$$

26. An optical instrument comprising:
an objective lens;
the reticle unit according to claim 22, wherein the reflection surface is arranged at a position of an image formed by the objective lens or at a position substantially conjugate to the image; and
an eyepiece for observation, wherein the image of the objective lens and the light exited from the reflection surface of the reticle unit are placed on top of each other.

27. A rifle scope comprising:
an objective lens;
the reticle unit according to claim 22, wherein the reflection surface is arranged at a position of an image formed by the objective lens or at a position substantially conjugate to the image; and
an eyepiece for observation, wherein the image of the objective lens and the light emitted from the reflection surface of the reticle unit are placed on top of each other.

28. A reticle unit comprising:
a reflector provided with a concave portion on one of surfaces of a plate-like optical member, wherein at least part of a side surface of the concave portion is a reflection surface;
a light source that is arranged laterally to the reflector and that emits light; and
a light collector that is arranged between the light source and the reflector and that collects the light from the light source onto a surface substantially parallel to the surface on which at least the concave portion is formed to form an image of the light source on or near the reflect ion surface, wherein
at least part of the light incident on the reflection surface is totally reflected by the reflection surface and the totally reflected light is exited from the reflector, wherein
an optical axis of the light source and the light collector is defined as a first optical axis, and an optical axis for reflecting the light by the reflection surface to exit the light from the reflector is define as a second optical axis, and wherein
the reflection surface is a cylindrical surface in which only a meridional plane, which includes the first optical axis and the second optical axis, has a curvature, and an intersection of the meridional plane and a sagittal plane, which includes the optical axis of the reflection surface and which is perpendicular to the meridional plane, is tilted substantially 45° relative to the second optical axis.

29. The reticle unit according to claim 28, wherein the first optical axis and the second optical axis are substantially orthogonal.

30. The reticle unit according to claim 28, wherein
the light collector is a condenser lens that collects the light from the light source in a surface orthogonal to a second optical axis and that converts the light from the light source to substantially parallel light in a surface including a first optical axis and the second optical axis, and
the reflection surface is a curved surface convex toward the light source.

31. The reticle unit according to claim 28, wherein
the reflection surface satisfies a condition of the following expression, wherein
Rm denotes a radius of curvature in the meridional plane, n denotes a refractive index of a medium of the reflector, and L denotes a diameter in a direction of the first optical axis of the concave portion:

$$\sin^{-1}\left(-\frac{L}{\sqrt{2}\cdot Rm}\right) + \frac{\pi}{4} > \sin^{-1}\left(\frac{1}{n}\right).$$

32. An optical instrument comprising:

an objective lens;

the reticle unit according to claim 28, wherein the reflection surface is arranged at a position of an image formed by the objective lens or at a position substantially conjugate to the image; and an eyepiece for observation, wherein the image of the objective lens and the light exited from the reflection surface of the reticle unit are placed on top of each other.

33. A rifle scope comprising:

an objective lens;

the reticle unit according to claim 28, wherein the reflection surface is arranged at a position of an image formed by the objective lens or at a position substantially conjugate to the image; and an eyepiece for observation, wherein the image of the objective lens and the light emitted from the reflection surface of the reticle unit are placed on top of each other.

34. A reticle unit comprising:

a reflector provided with a concave portion on one of surfaces of a plate-like optical member, wherein at least part of a side surface of the con cave portion is a reflection surface;

a light source that is arranged laterally to the reflector and that emits light; and a light collector that is arranged between the light source and the reflector and that collects the light from the light source onto a surface substantially parallel to the surface on which at least the concave portion is formed to form an image of the light source on or near the reflection surface, wherein at least part of the light incident on the reflection surface is totally reflected by the reflection surface and the totally reflected light is exited from the reflector, and wherein a diameter when the reflection surface is projected to the side surface provided with the concave portion forming the reflection surface is within a range of 10 μm to 200 μm.

35. An optical instrument comprising:

an objective lens;

the reticle unit according to claim 34, wherein the reflection surface is arranged at a position of an image formed by the objective lens or at a position substantially conjugate to the image; and an eyepiece for observation, wherein the image of the objective lens and the light exited from the reflection surface of the reticle unit are placed on top of each other.

36. A rifle scope comprising:

an objective lens;

the reticle unit according to claim 34, wherein the reflection surface is arranged at a position of an image formed by the objective lens or at a position substantially conjugate to the image; and an eyepiece for observation, wherein the image of the objective lens and the light emitted from the reflection surface of the reticle unit are placed on top of each other.

* * * * *